(12) United States Patent
Fritts et al.

(10) Patent No.: US 10,284,047 B2
(45) Date of Patent: May 7, 2019

(54) ELECTRIC MOTOR FOR WASHDOWN, FOOD PROCESSING, AND CHEMICAL APPLICATIONS

(71) Applicant: BLUFFTON MOTOR WORKS LLC, Bluffton, IN (US)

(72) Inventors: Ryan Matthew Fritts, Ossian, IN (US); David Kent Puterbaugh, Geneva, IN (US)

(73) Assignee: Bluffton Motor Works LLC, Bluffton, IN (US)

( * ) Notice: Subject to any disclaimer, the term of this patent is extended or adjusted under 35 U.S.C. 154(b) by 376 days.

(21) Appl. No.: 15/149,691

(22) Filed: May 9, 2016

(65) Prior Publication Data

US 2017/0324296 A1    Nov. 9, 2017

(51) Int. Cl.
| | |
|---|---|
| *H02K 5/10* | (2006.01) |
| *H02K 5/22* | (2006.01) |
| *H02K 9/04* | (2006.01) |

(52) U.S. Cl.
CPC ............ *H02K 5/10* (2013.01); *H02K 5/225* (2013.01); *H02K 9/04* (2013.01)

(58) Field of Classification Search
CPC .. H02K 5/10; H02K 5/22; H02K 9/04; H02K 5/225
USPC ..................................................... 310/71, 89
See application file for complete search history.

(56) References Cited

U.S. PATENT DOCUMENTS

| | | | |
|---|---|---|---|
| 4,709,124 A | 11/1987 | Wheeler et al. | |
| 5,006,742 A | 4/1991 | Strobl et al. | |
| 5,055,000 A | 10/1991 | Akhter | |
| 6,657,338 B2 | 12/2003 | Fisher et al. | |
| 6,674,199 B2 | 1/2004 | Long | |
| 7,042,124 B2 | 5/2006 | Puterbaugh et al. | |
| 7,211,914 B2 * | 5/2007 | Hofmann | H02K 5/10 310/68 R |

(Continued)

FOREIGN PATENT DOCUMENTS

| | | |
|---|---|---|
| DE | 102008024330 A1 | 11/2009 |
| EP | 0868008 A1 | 9/1998 |

(Continued)

*Primary Examiner* — Naishadh N Desai
(74) *Attorney, Agent, or Firm* — Calfee, Halter & Griswold LLP

(57) ABSTRACT

An exemplary electric motor includes a power entry compartment, a power connection compartment, a removable cover, and a sealing member positioned between the power entry compartment and the power connection compartment to create a moisture-tight seal between the power entry compartment and the power connection compartment. The removable cover at least partially encloses or seals the power entry compartment and the power connection compartment. The power entry compartment receives the electrical wires that power the electric motor. The sealing member between the power entry compartment and the power connection compartment includes at least one wire channel to allow wires that power the electric motor to enter the power connection compartment from the power entry compartment. The power connection compartment houses one or more components used to make the electrical connections between the electrical wires and the motor.

28 Claims, 17 Drawing Sheets

(56) References Cited

U.S. PATENT DOCUMENTS

| | | |
|---|---|---|
| 7,492,071 B2 | 2/2009 | Chaohai et al. |
| 7,786,635 B2 | 8/2010 | Gasser et al. |
| 8,227,947 B2 | 7/2012 | Oleson et al. |
| 8,299,662 B2 | 10/2012 | Schmidt et al. |
| 8,546,984 B2 | 10/2013 | Heilman et al. |
| 8,643,231 B2 | 2/2014 | Flanary |
| 2002/0117919 A1* | 8/2002 | Williams ............... H02K 5/225 |
| | | 310/89 |
| 2005/0110354 A1 | 5/2005 | Datta |
| 2011/0023640 A1 | 2/2011 | Hanson et al. |

FOREIGN PATENT DOCUMENTS

| | | |
|---|---|---|
| EP | 1204194 A1 | 5/2002 |
| EP | 2589817 A1 | 5/2013 |
| FR | 2783648 A1 | 3/2000 |

* cited by examiner

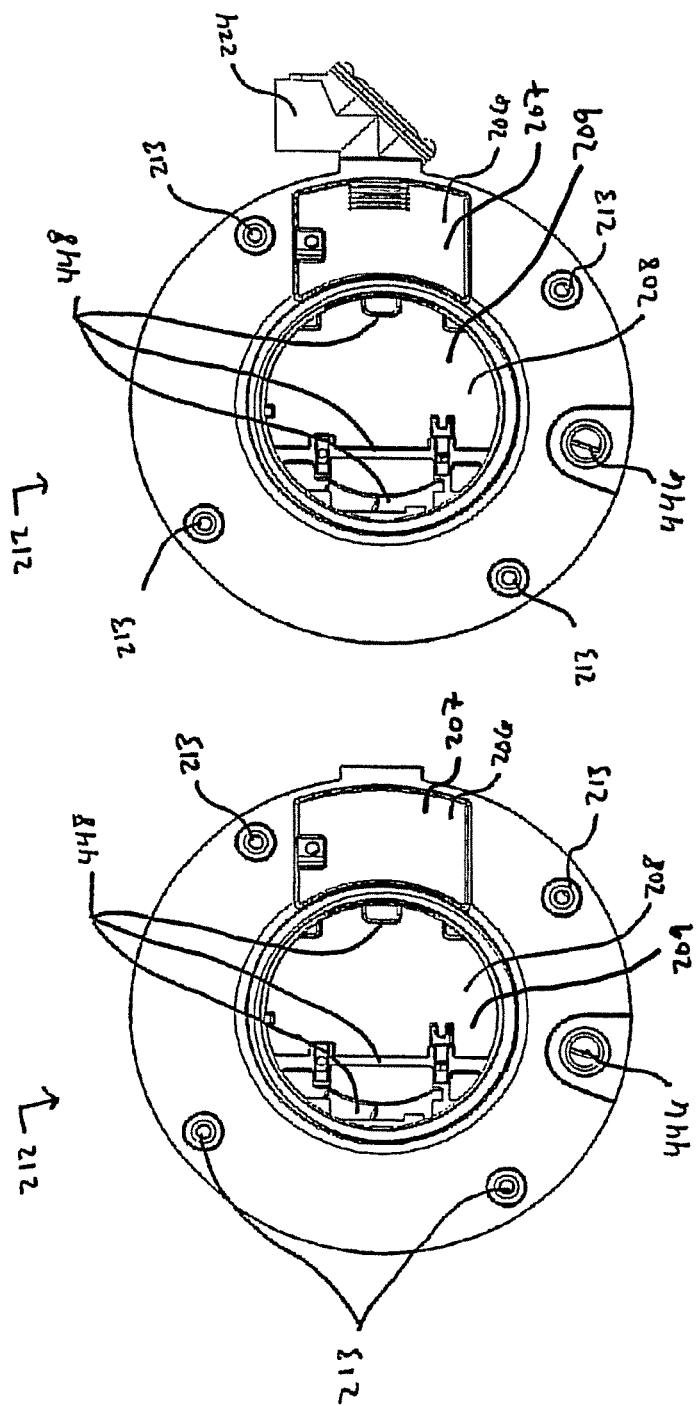

ELECTRIC MOTOR FOR WASHDOWN, FOOD PROCESSING, AND CHEMICAL APPLICATIONS

BACKGROUND

Commercial food processing facilities and the food products moving through such facilities must be maintained in a scrupulously clean condition. One method of achieving this high level of cleanliness is by means of cleaning the processing equipment used in the facility with high-pressure, hose-down cleaning with steam, hot water and/or chemical solutions. During the course of this cleaning process, electric motors utilized in the manufacturing operation are exposed to harsh, wet, corrosive and/or oxidative conditions. These "washdown motors," as they are referred to in the industry, are also used in chemical manufacturing facilities and other similar environments.

This combination of steam, heat, moisture and other corrosive factors typically results in very short life cycles for washdown motors. In the course of the cleaning process, the level of humidity in the facility being cleaned increases and corrosive chemicals can become dissolved in the wastewater. The resultant high humidity, particularly in combination with dissolved chemicals in the atmosphere, produces a highly corrosive environment and the effective life of a conventional motor can be drastically reduced because of water or other fluid contaminants entering the motor and causing either mechanical or electrical failure. It is not uncommon for such motors to fail within a matter of a few months; in some applications failure occurs in a matter of days or weeks. This need to constantly replace washdown motors is an added expense to food processors and other users of such motors. Additionally, the need to suspend operations while repairs are made is disruptive to the flow of product through the processing facility and results in increased labor costs. In industries which have continuous processes in operation, the down time experienced for the repair can have significant detrimental consequences.

Electric motors typically include an electrical inlet that receives the electrical wires that provide power to the motor, and, if adequate measures aren't taken, such electrical inlets often serve as an entry point for moisture to enter the motor. Certain current designs for electric washdown motors include an external conduit box or junction box that is in communication with the electrical inlet of the motor and houses the wire-to-wire electrical connections between the electrical wires used to provide power to the motor and the electrical wires that extend from inside the motor into the junction box. In such motors, a seal is positioned around the electrical wires passing from inside the motor to the junction box to prevent water from entering the electrical inlet of the motor. Additionally, the individual wire-to-wire electrical connections between the electrical wires and the power wires are sealed within the junction box so the presence of electrically conductive liquid within the junction box does not cause a short circuit or corrode the wire-to-wire electrical connections. For example, the bare wire ends may be crimped inside a metal tube to make the electrical connection and sealed with a heat-shrinkable polymer tube lined with a layer of hot-melt adhesive to seal the connection.

However, this arrangement provides several disadvantages. For example, in a situation where a motor fails in use during a production process, time is of the essence to replace the electrical connections because motor downtime creates a significant loss in production, which can have a significant economic impact. For instance, the actions required to disconnect and remake the sealed wire-to-wire electrical connections are very time consuming. Also, for a dual voltage three-phase motor, there may be four sealed wire-to-wire electrical connections (for low voltage) and six sealed wire-to-wire connections (for high voltage), which means multiple crimp connections of wires must be completed and sealed with heat-shrinkable polymer tubing. Additionally, because the electrical connections are sealed inside of a junction box, the time it takes to remove the junction box (which usually includes multiple separate screws) further adds to the length of downtime and possible loss of production time.

Therefore, there is a need for an improved electric motor that provides an improved arrangement for making and protecting the electrical power connections to the motor and which can be used in washdown applications. Additionally, there is a need for an electric motor that provides an improved arrangement for making and/or replacing the electrical connections of the motor to reduce the time it takes to make and/or replace the electrical connections of the motor while maintaining washdown resistance. There is also a need for an improved electric motor that can withstand constant washings with water and/or other cleaning agents and exhibits increased resistance to the ingress of moisture into the motor interior that results in an extended life for the motor when used in adverse conditions, such as the repeated washings experienced in food processing plants.

SUMMARY

The present disclosure discloses various electric motors, such as, for example, electric motors for use in commercial food processing facilities and other washdown applications. In addition, the present disclosure also discloses various components, including electric motor end bells, power connection blocks, and junction boxes, for use in electric motors for commercial food processing facilities and other washdown applications In an exemplary embodiment, an electric motor is provided that includes a power entry compartment, a power connection compartment, a removable cover, and a sealing member positioned between the power entry compartment and the power connection compartment to create a moisture-tight seal between the power entry compartment and the power connection compartment. The removable cover encloses or seals the power entry compartment and the power connection compartment. The power entry compartment receives the electrical wires that power the electric motor. The sealing member between the power entry compartment and the power connection compartment includes at least one wire channel to allow wires that power the electric motor to enter the power connection compartment from the power entry compartment. The power connection compartment houses one or more components used to make the electrical connections between the electrical wires and the motor. In various embodiments, a sealing member is disposed between the removable cover and the power connection compartment. In various embodiments, the power connection compartment houses a power connection block. In various embodiments, the power entry compartment and power connection compartment may be disposed in an end bell. In various additional embodiments, the power entry compartment and power connection compartment may be disposed in junction box mounted to an exterior of the electric motor.

In an additional exemplary embodiment, an electric motor is provided that includes a stator assembly, a rotor assembly, and an end bell. The end bell includes a power entry compartment, a power connection compartment, an interior electrical opening located between the power entry compartment and the power connection compartment, an exterior electrical opening, a removable cover, and a sealing member positioned in the interior electrical opening to create a moisture-tight seal between the power entry compartment and the power connection compartment. The removable cover encloses the power entry compartment and the power connection compartment. The power entry compartment receives the electrical wires that power the electric motor through the exterior electrical opening. The sealing member positioned in the interior electrical opening includes at least one wire channel to allow wires that power the electric motor to enter the power connection compartment from the power entry compartment. The power connection compartment houses one or more components used to make the electrical connections between the electrical wires and the motor. In various embodiments, a sealing member is disposed between the removable cover and the power connection compartment. In various embodiments, the power connection compartment houses a power connection block.

In an additional exemplary embodiment, an electric motor is provided that includes a stator assembly, a rotor assembly, a power connection block, and an end bell. The power connection block has at least one wire insertion opening. The end bell is attached to a motor casing and includes a power entry compartment, a power connection compartment, a unitary removable cover, a sealing member, a first opening, a grommet, and a second opening. The power connection compartment houses the power connection block. The unitary removable cover attaches to the end bell by a threaded connection and encloses the power entry compartment and the power connection compartment. The sealing member is disposed between the one-piece removable cover and the power connection compartment. The first opening extends between the power entry compartment and the power connection compartment. The grommet has at least one wire channel that aligns with the at least one insertion opening of the power connection block, and the grommet is disposed in the first opening and seals the power connection compartment from the power entry compartment. The second opening extends between an outer surface of the end bell and the power entry compartment.

In an additional embodiment, an electric motor is provided that includes a stator assembly, a rotor assembly, and a junction box. The junction box includes a power entry compartment, a power connection compartment, an interior electrical opening located between the power entry compartment and the power connection compartment, an exterior electrical opening, a removable cover, an electric motor inlet, and a sealing member positioned in the interior electrical opening to create a moisture-tight seal between the power entry compartment and the power connection compartment. The removable cover encloses the power entry compartment and the power connection compartment. The power entry compartment receives the electrical wires that power the electrical motor through the exterior electrical opening. The sealing member positioned in the interior electrical opening includes at least one wire channel to allow wires that power the electric motor to enter the power connection compartment from the power entry compartment. The electrical motor inlet includes a motor opening that extends from an interior of the electric motor to the power connection compartment of the junction box when the junction box is mounted to the exterior of the motor. The power connection compartment houses one or more components used to make the electrical connections between the electrical wires and the motor. In various embodiments, a sealing member is disposed between the removable cover and the power connection compartment. In various embodiments, a sealing member is disposed between the electrical motor inlet and the interior of the electric motor. In various embodiments, the power connection compartment houses a power connection block. In various embodiments, the electric motor includes an external cooling fan.

Various objects and advantages will become apparent to those skilled in the art from the following detailed description of the invention, when read in light of the accompanying drawings. The accompanying drawings, which are incorporated in and constitute a part of the instant application, illustrate embodiments exemplifying the general inventive concepts of the invention, and together with the description, serve to explain the principles of the general inventive concepts. It is to be expressly understood, however, that the drawings are for illustrative purposes and are not to be construed as defining the limits of the invention.

BRIEF DESCRIPTION OF THE DRAWINGS

FIG. 4B is a front view of the exemplary end bell of FIG. 2 without an electrical conduit attached;

FIG. 4C is a front view of the exemplary end bell of FIG. 2 with an electrical conduit attached

DETAILED DESCRIPTION

Figure 1:
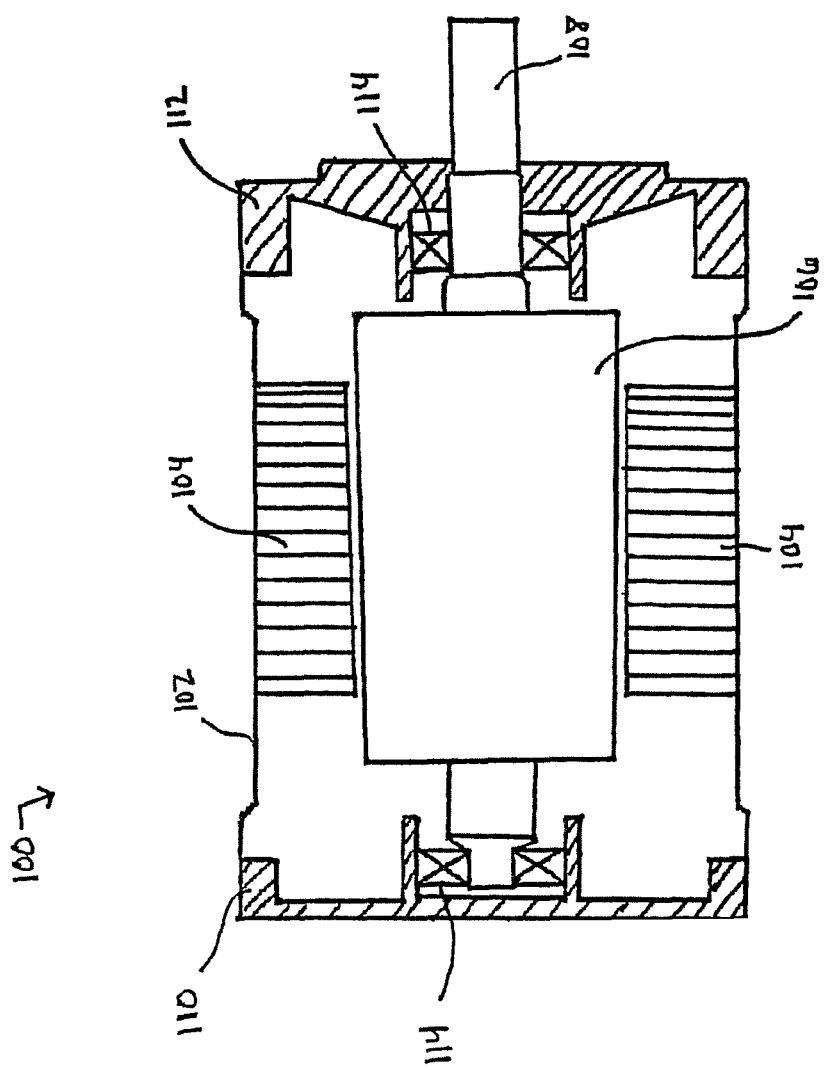
FIG. 1 is a cross-sectional side view of a conventional electric motor.

The general inventive concepts will now be described with occasional reference to the exemplary embodiments of the invention. This general inventive concept may, however, be embodied in different forms and should not be construed as limited to the embodiments set forth herein. Rather, these embodiments are provided so that this disclosure will be thorough and complete, and will fully convey the scope of the general inventive concepts to those skilled in the art. While the exemplary embodiments of the present invention describe an electric motor used in settings that undergo aggressive washdown, it should be understood that the inventive concepts described herein can be utilized in any electric motor that requires electrical connections to be protected from moisture or any other substance or electric motors for which increased resistance to the ingress of moisture into the motor interior is desired. For example, the general inventive concepts may be utilized in induction motors, universal motors, synchronous motors, shaded pole motors, pancake motors, permanent magnet motors, brushed motors, brushless motors, stepper motors, or any other type of motor that requires electrical connections to be protected from moisture or any other substances.

This detailed description merely describes exemplary embodiments in accordance with the general inventive concepts and is not intended to limit the scope of the invention or the claims in any way. Except as otherwise specifically defined herein, all terms used herein have the same meaning as commonly understood by one of ordinary skill in the art to which the general inventive concepts belong. The terminology used in the description of the invention herein is for describing particular embodiments only and is not intended to be limiting of the general inventive concepts. Indeed, the invention as described by the claims is broader than and unlimited by the exemplary embodiments set forth herein, and the terms used in the claims have their full ordinary meaning. As used in this description and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Electric motors are used in a various number of settings, and some of these settings must maintain a high level of cleanliness, such as, for example, a commercial food processing facility. Accordingly, in order to maintain a high level of cleanliness, these settings and the processing equipment used in these facilities are often subject to an aggressive washdown, which means that the electric motors are often subject to the washdown. A washdown may include high pressure spray with hot water, hot water with strong detergents, and/or hot water with strong sanitizing chemicals. Consequently, the electric motors may be exposed to harsh, oxidative or corrosive conditions, which cause the motors to have very short life cycles. Motor failure may be a result of a chemical attack on the electrical connections to the motor. Therefore, an electric motor with an arrangement for making and protecting the electrical power connections of the motor and the internal components of the motor is desired.

Referring now to the drawings, FIG. 1 is a cross-sectional view of a conventional electric motor 100. The electric motor 100 generally includes a cylindrical motor casing or shell 102, a stator 104 mounted within the motor casing 102, a rotor 106, a shaft 108 with at least one end of the shaft extending outside of the motor casing for coupling to an exterior device (e.g. a pump), a first end bell 110, and a second end bell 112, and bearing assemblies 114 housed in the end bells 110, 112 for accommodating rotation of the shaft 108. The first end bell 110 is positioned at one end of the casing 102, and the second end bell 112 is positioned at the other end of the casing 102. An electrical inlet (not shown) is used to provide power to the motor 100. The electrical inlet may be in the first end bell 110, the second end bell 112, or the casing 102.

In accordance with the general inventive concepts, in an exemplary embodiment, an electric motor is provided that includes a power entry compartment, a power connection compartment, a removable cover, and a sealing member positioned between the power entry compartment and the power connection compartment to create a moisture-tight seal between the power entry compartment and the power connection compartment. The removable cover encloses or seals the power entry compartment and the power connection compartment. The power entry compartment receives the electrical wires that power the electric motor. The sealing member between the power entry compartment and the power connection compartment includes at least one wire channel to allow the electrical wires that power the electric motor to enter the power connection compartment from the power entry compartment. The power connection compartment houses one or more components used to make the electrical connections between the electrical wires and the motor. In various embodiments, a sealing member is disposed between the removable cover and the power connection compartment. In various embodiments, the power connection compartment houses a power connection block. In various embodiments, the power entry compartment and power connection compartment may be disposed in an end bell. In various additional embodiments, the power entry compartment and power connection compartment may be disposed in junction box mounted to an exterior of the electric motor.

Figure 2:
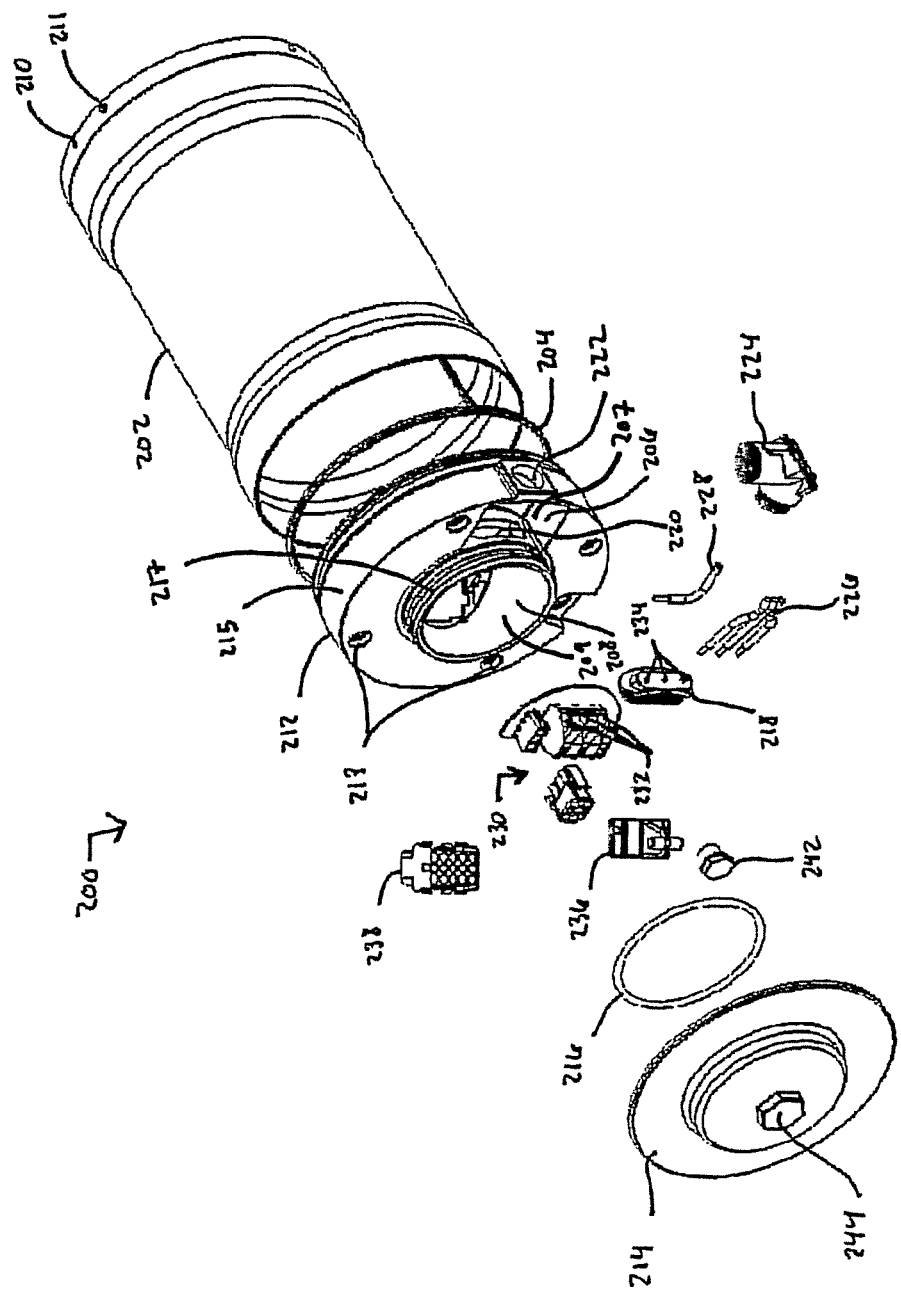
FIG. 2 is an exploded perspective view of a first exemplary embodiment of an electric motor having an exemplary end bell.

Referring now to FIG. 2, an exploded view of a first exemplary embodiment of an electric motor 200 in accordance with the general inventive concepts is illustrated. The electric motor 200 generally includes a cylindrical motor casing 202, a first end bell 210 and second end bell 212 attached to each end of the casing 202 to close the opposed open ends of the motor casing. While the motor casing 202 of the illustrated embodiment has a cylindrical shape and the end bells 210, 212 are cylindrically shaped end caps, the motor casing 202 and end bells 210, 212 may have any suitable shape in alternative embodiments. The motor casing 202 and end bells 210, 212 may be formed from metal or other suitable materials. For example, the motor casing 202 and end bells 210, 212 may be manufactured from a corrosion-resistant material such as stainless steel.

The structural components of the exemplary electric motor 200 include the basic elements of a conventional electric motor, including a stator assembly (not shown) fixedly mounted within the motor casing 202, a rotor shaft assembly (not shown) with at least one end of the shaft extending outside of the motor casing 202 for coupling to an exterior device, and bearing assemblies (not shown) for accommodating rotation of the shaft.

In the illustrated embodiment, end bell 210 and end bell 212 of electric motor 200 are attached to one another by a plurality of fasteners (not shown), such as elongated screws. In the illustrated embodiment, the screws pass through holes 213 in end bell 212, travel through the interior of the motor casing 202 and attach to end bell 210. The casing 202 of the motor 200 is disposed between the two end bells 210, 212 such that the interior of the motor is defined by the two end bells 210, 212 and the motor casing 202. In additional embodiments, the end bells 210, 212 may be connected directly to the casing 202 by a threaded connection, a snap fit, fasteners, welding or any other suitable fastening method. In an alternative embodiment, one end bell 212 may be attached to the casing 202 by any method described above, and the other end bell 210 may be permanently affixed to the end bell, such as by welding, or vice versa. In yet another embodiment, the casing 202 may take the form of a deep drawn can, and the motor may only include a single end bell 212 that is attached to the casing by any of the methods described above. In certain embodiments, the at least one of the end bells 210, 212 is removably attached to the casing 202 to allow for the end bell 210, 212 to be removed from the motor casing 202 to permit access to the interior of the electric motor 200 for purposes of maintaining and servicing the internal components of the electric motor 200. In various embodiments, a sealing member 204 may be positioned between each end bell 210, 212 and the casing 202 to prevent moisture from entering the interior of the electric motor 200 by way of the junction between the end bells 210, 212 and the casing 202. In certain embodiments, the sealing member 204 may be an O-ring. In the illustrated embodiment of electric motor 200, drain holes 211 are provided in the end bell 210 for draining any moisture that may accumulate inside a central cavity (not shown) of the end bell 210. The drain holes 211 prevent flooding of a gear box (not shown) that is connected to the motor 200.

As illustrated in FIG. 2, the end bell 212 generally includes a power entry compartment 206, a power connection compartment 208, a removable cover 214, a main body 215, a sealing member 216, and a sealing member 218. The power entry compartment 206 and power connection compartment 208 are defined within the main body 215 of end bell 212 adjacent to one another. In the exemplary embodiment illustrated in FIG. 2, the power connection compartment 208 includes a main opening 209 that has a generally circular shape that is surrounded by threaded portion 217 of the end bell 212. The main opening 209 of the power connection compartment 208 provides access to the electrical connections of the electric motor 200. In the exemplary embodiment illustrated in FIG. 2, the power entry compartment 206 includes a main opening 207 and has a generally arcuate shape with curved side walls. The main opening 207 of the power entry compartment 206 provides access to the area of the power entry compartment 206 into which electrical wires enter the electric motor 200 and from which they are then fed into the power connection compartment 208. In additional embodiments, the power entry compartment 206, the power connection compartment 208, and the main openings 207, 209 of each compartment may be shaped and configured differently.

The removable cover 214 is shaped and configured to at least partially enclose the power entry compartment 206 and the power connection compartment 208 when the removable cover 214 is attached to the main body 215 of end bell 212. In various embodiments, the removable cover 214 encloses/seals the main opening 209 of the power connection compartment 208, and encloses/seals or at least partially encloses/seals the main opening 207 of the power entry compartment 206. The removable cover 214 may be a unitary piece, as shown in the illustrated embodiment. In other embodiments, the removable cover 214 may be comprised of multiple pieces. The exemplary removable cover 214 illustrated in FIG. 2 is attached to the end bell 212 by threads (not shown) that engage with a threaded collar 217 that extends from end bell 212 around the circumference of the power connection compartment 208. The removable cover 214 includes a wrenching boss 244 to be used in attaching/removing the removable cover 214 to/from the end bell 212 to allow access to the interior of the power entry compartment 206 and the power connection compartment 208. The wrenching boss 244 provides a quick means of attaching/removing the removable cover 214. In additional embodiments the removable cover 214 may be attached to end bell 212 in different ways, such as by a snap fit, fasteners, or any other suitable attachment mechanism. For example, one or more screws may be used to attach the removable cover 214 to end bell 212 or other portion of the electric motor 200 in various embodiments. The removable cover 214 may also be attached to the end bell 212 at a different location in alternative embodiments. For example, the threaded collar 217 may surround both the power entry compartment 206 and the power connection compartment 208 in additional embodiments. The removable cover 214 may have a variety of suitable shapes and configurations in various embodiments.

The end bell 212 with removable cover 214 of the illustrated exemplary embodiment can be in place of a junction box. The removable cover 214 reduces the time it takes to replace the electrical connections for the electric motor 200, as compared to a junction box, because the cover can be removed and the electrical connections of the electric motor 200 can be accessed more easily, quickly and efficiently than when a junction box is used. For example, a conventional junction box typically includes multiple fasteners that can be difficult and time consuming to remove and reinstall. In contrast, the removable cover 214 can be easily unscrewed and reinstalled by way of the threaded connection between the removable cover 214 and end bell 212.

The sealing member 216 is disposed between the removable cover 214 and the main opening 209 of the power connection compartment 208. In the exemplary embodiment illustrated in FIG. 2, the sealing member 216 encircles the threaded collar 217. The removable cover 214, sealing member 216 and threaded collar 217 are adapted and configured to enclose and seal the main opening 209 of the power connection compartment 208 of end bell 212 when the removable cover 214 is attached to end bell 212 to provide a moisture-tight seal between the motor exterior and the power connection compartment 208 that prevents moisture from entering the power connection compartment 208. In the illustrated exemplary embodiment, the sealing member 216 is an O-ring, although the sealing member 216 may be shaped and configured differently in additional embodiments. The sealing member 216 may be made from rubber, plastic, other polymeric or elastomeric materials or any other suitable materials. In alternative embodiments, the removable cover 214 may at least partially include rubber, plastic, other polymeric or elastic materials, or any other suitable material to prevent moisture from entering the main opening 209 of the power connection compartment 208. In these alternative embodiments, the sealing member 216 may not be needed.

The removable cover 214 also protects the main opening 207 of the power entry compartment 206. In the exemplary embodiment of motor 200 illustrated in FIG. 2, an inner surface of the removable cover 214 contacts an outer surface of the main body 215 of end bell 212 when the removable cover 214 is attached to the end bell 212. While the junction between the inner surface of the removable cover 214 and the end bell 212 of the illustrated embodiment does not provide a moisture-tight seal, it generally protects the main opening 207 of the power entry compartment 206 from much of the moisture that results from a direct high pressure spray during the cleaning process. In additional embodiments, a seal may be disposed between the removable cover 214 and the end bell 212 to provide a moisture-tight seal between the motor exterior and the power entry compartment 206 when the removable cover 214 is attached to the end bell 212. In these additional embodiments, this additional seal may be provided in addition to or in replacement of the sealing member 216 that creates a moisture-tight seal between the motor exterior and the power connection compartment 208.

Figure 4A:
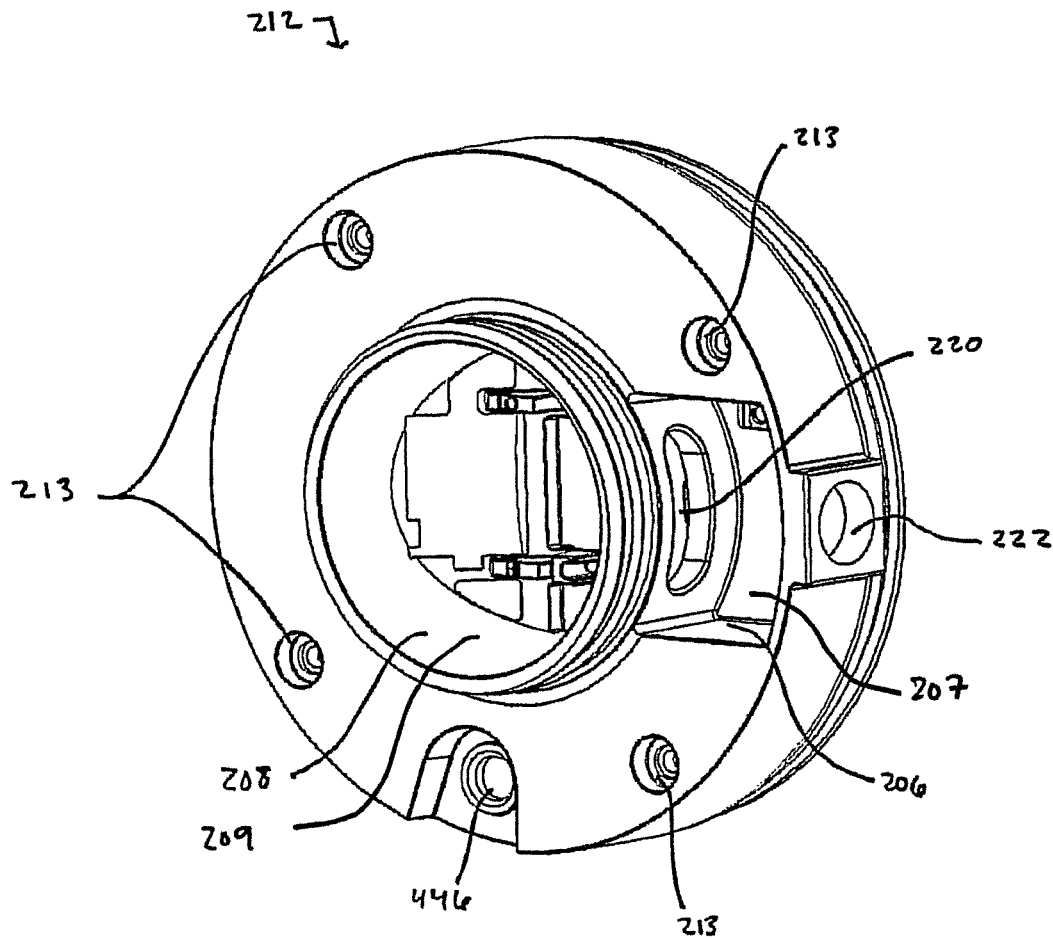
FIG. 4A is a perspective view of the exemplary end bell of FIG. 2.

Referring to FIGS. 4A-4C, the end bell 212 of the illustrated embodiment includes an interior electrical opening 220 located between the power entry compartment 206 and the power connection compartment 208. The interior electrical opening 220 is configured to receive the sealing member 218. The sealing member 218 is adapted and configured to receive electrical wires 226 that travel between the power entry compartment 206 and the power connection compartment 208 and to provide a seal between the power entry compartment 206 and the power connection compartment 208. In alternative embodiments, the sealing member 218 may also be adapted and configured to receive the ground wire 228 to allow the ground wire 228 to travel from the power entry compartment 206 to the power connection compartment 208. In the illustrated embodiment, the sealing member 218 is a grommet, although in additional embodiments different types of sealing members may be used.

Figure 9:
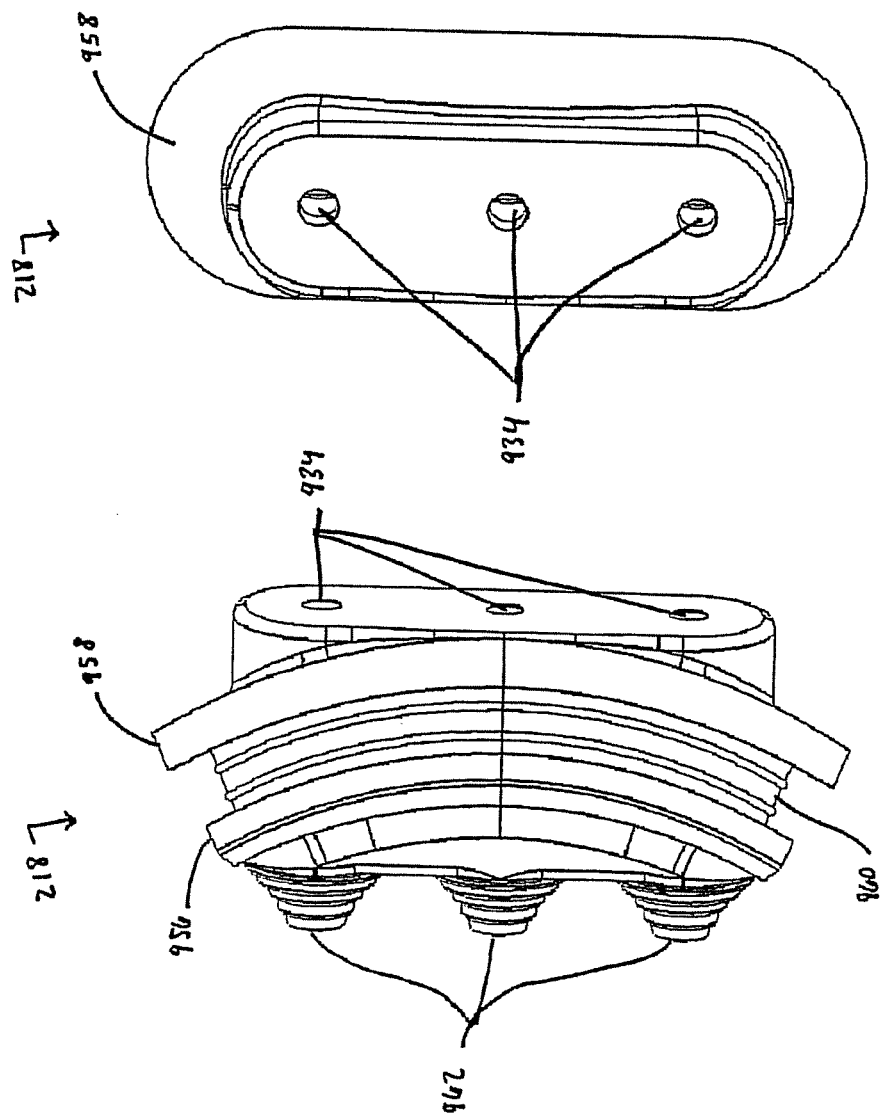
FIG. 9A is side view of an exemplary grommet.
FIG. 9B is a front view of the exemplary grommet of FIG. 9A.

Referring now to FIGS. 9A and 9B, one exemplary sealing member 218 that can be used with the electric motor 200 is illustrated in greater detail. Sealing member 218 includes an inner portion 956, an outer portion 958, and a central portion 960. The sealing member 218 is sized, shaped and configured so that when it is in an installed state, the central portion 960 of sealing member 218 is positioned in interior electrical opening 220 with inner portion 956 positioned in the power connection compartment 208 and outer portion 958 positioned in the power entry compartment 206. In this manner, the sealing member 218 creates a seal between the power connection compartment 208 and the power entry compartment 206. Sealing member 218 includes a plurality of wire channels (not shown) that traverse the width of the sealing member between a channel entrance 934 and channel end 962 and are each configured to receive at least one wire. The diameter of the wire channels 934 taper inwardly along the length of the channel, so the diameter of the wire channels at the channel end 962 is smaller than the diameter of the channel at the channel entrance 934. Due to the tapered diameter of the channels, the outer surface of a wire that is inserted into the channel will contact the inwardly tapered diameter of the channel at a location along the length of the channel, thus creating a seal between the wire and the inner wall of the channel. In this fashion, the tapered diameter of the interior walls of the channel will seal against wires having a range of diameters. As a result, seal 218 allows for push-through insertion of, and provides a moisture-tight seal around, a range of wire diameters. This permits wires of different diameters to be inserted quickly through seal 218, while still creating a moisture-tight seal around the electrical wires.

Consequently, when electrical wires 226 and ground wire 228 are inserted into the wire channels 934, the sealing member 218 creates a moisture-tight seal between the power entry compartment 206 and the power connection compartment 208 to keep moisture and other substances from entering the power connection compartment 208. The sealing member 218 may be made from rubber, plastic, other polymeric or elastomeric materials or any other suitable materials. The moisture-tight push-through seal 218 that seals the area in which the electrical connections are made replaces the heat-shrink tube sealing used in many conventional washdown motors and dramatically reduces the time it takes to make and replace the electrical connections.

The removable cover 214 (along with sealing member 216 and threaded collar 217) provides a moisture-tight seal between the motor exterior and the power connection compartment 208, and sealing member 218 provides a moisture-tight seal between the power entry compartment 206 and the power connection compartment 208. In this way, a complete seal of the power connection compartment 208 is achieved and moisture is prevented from entering the power connection compartment 208 through the main opening 209 and through the interior electrical opening 220 between the power entry compartment 206 and the power connection compartment 208.

Figure 3A:
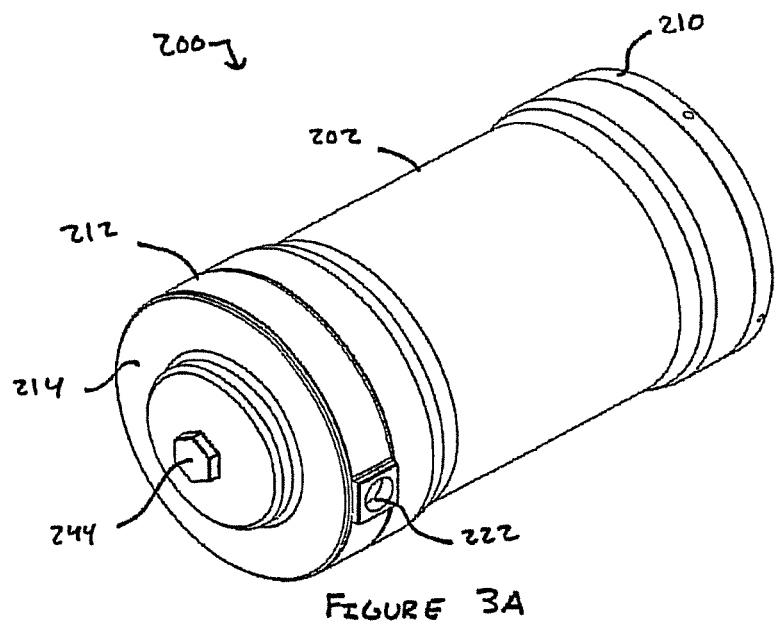
FIG. 3A is a perspective view of the exemplary electric motor of FIG. 2 without an electrical conduit attached.
Figure 3B:
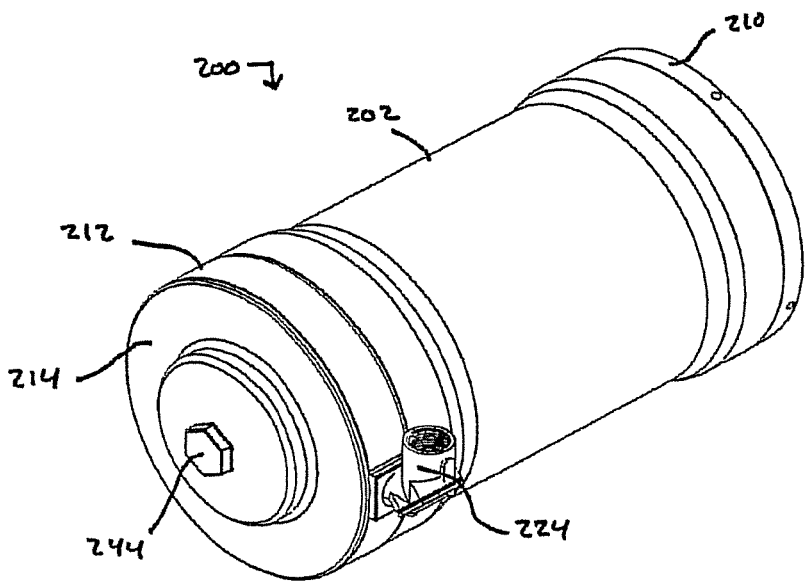
FIG. 3B is a perspective view of the exemplary electric motor of FIG. 2 with an electrical conduit attached.

Referring again to FIGS. 4A-4C, an exterior electrical opening 222 extends between the power entry compartment 206 and the outer surface of the end bell 212. Referring to FIGS. 3A-3B, the exterior electrical opening 222 is configured to receive an electrical conduit 224 that houses the electrical wires that power the electric motor 200. The exterior electrical opening 222 is configured to receive an electrical conduit 224 that houses the electrical wires that power the electric motor 200. In the exemplary embodiment illustrated in FIG. 2, the electrical conduit 224 may connect to end bell 212 by a threaded connection. In additional embodiments, the electrical conduit may connect to the end bell 212 by a snap fit, fasteners, welds or other fastening means.

Figure 5:
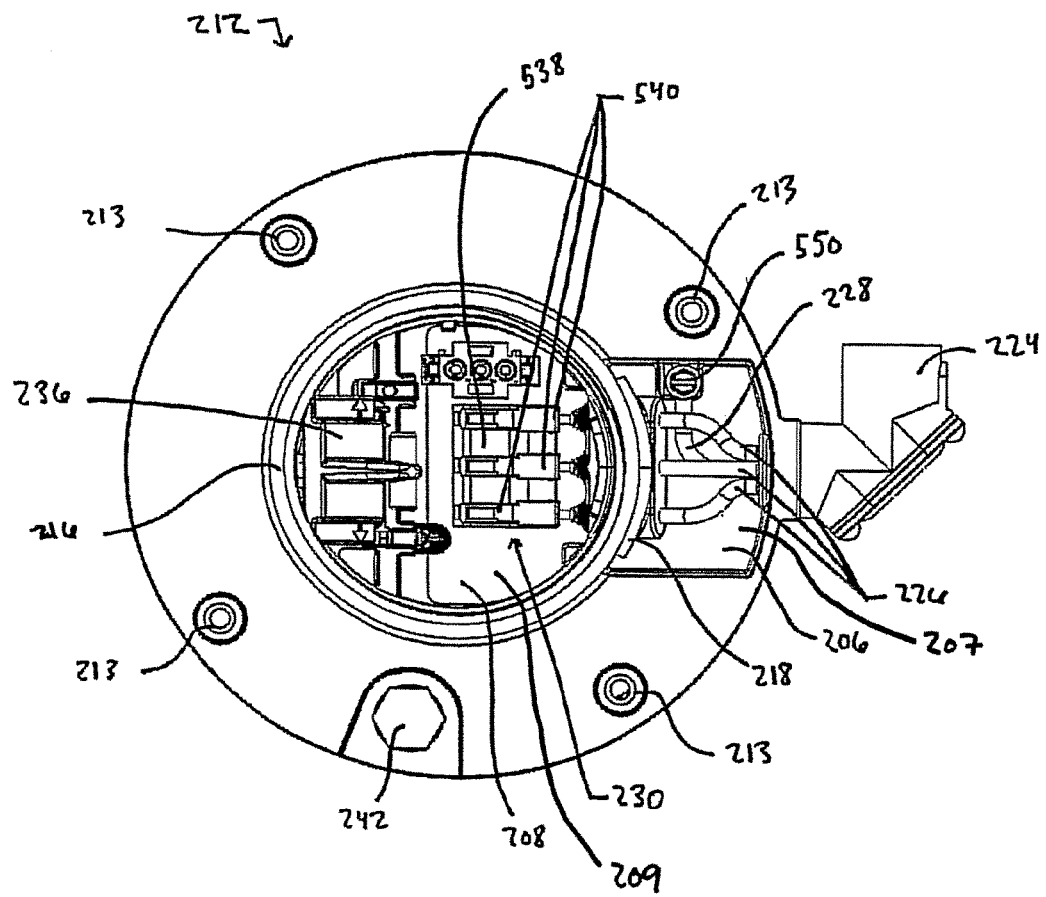
FIG. 5 is a front view of the exemplary end bell of FIG. 2 with electrical connections and sealing members installed.

Referring now to FIG. 5, the electric conduit 224 carries electrical wires 226 and ground wire 228 to motor 200. The electrical wires 226 and ground wire 228 enter the power entry compartment 206 through the exterior electrical opening 222 from electrical conduit 224. The ground wire 228 connects to the motor 200 in the power entry compartment 206 at ground wire connection point 550. Sealing member 218 includes at least one wire channel (not shown) to allow electrical wires 226 to enter the power connection compartment 208 from power entry compartment 206. As previously discussed, the power connection compartment 208 is sealed from the power entry compartment 206 by the seal created between electrical wires 226 and the inner surface of the channels of sealing member 218. As a result, if any moisture enters the power entry compartment 206 either through exterior electrical opening 222 from the electric conduit 224 or through any gaps between the end bell 212 and removable cover 214, such moisture is prevented from entering the power connection compartment 208 by the moisture-tight seal created by seal 218. Furthermore, since no wire-to-wire electrical connections are made in the power entry compartment 206 of the illustrated exemplary embodiment, if moisture enters the power entry compartment 206, it is not likely to cause a short circuit or corrode any wire-to-wire electrical connections.

Electrical components used to make the electrical connections of the electric motor 200 to provide power to the electric motor 200 are disposed in the power connection compartment 208. For example, in the illustrated exemplary embodiment, a power connection block 230 on a printed circuit board (not shown), a wire receptacle 238 (see FIG. 2), and a jumper plug 236 are disposed in the power connection compartment 208, with the wire receptacle 238 located behind the jumper plug 236. However, any electrical components required to make the electrical connections for the electric motor 200 may be disposed in the power connection compartment 208 in additional embodiments. Referring to FIGS. 4B-4C, in the illustrated embodiment, the power connection compartment 208 includes members 448 for attachment of the electrical components to the motor 200. In other embodiments, the power connection compartment 208 may be configured to attach other types of electrical components to the motor 200.

The power connection block 230 includes at least one wire insertion opening 232 configured to connect the electrical wires 226 to the electric motor 200. In the illustrated exemplary embodiment, the wire insertion openings 232 of the power connection block 230 are aligned with the channel end 962 of the wire channels of the sealing member 218. The electrical wires 226 connect to the power connection block 230 through the wire insertion openings 232. In various embodiments, the power connection block 230 may include various numbers of wire insertion openings 232. For example, in the illustrated embodiment, the electric motor 200 is a three phase motor, which requires three electrical wires 228, and the power connection block 230 has three wire insertion openings 232. In other embodiments, the electric motor 200 may require two, four, or five electrical wires 228, and the power connection block 230 may have two, four, or five wire insertion openings 232, respectively.

Various embodiments of the power connection block 230 of motor 200 includes a locking mechanism 538, which locks the electrical wires 226 in place and prevents them from becoming inadvertently disconnected from the power connection block 230. For example, the illustrated exemplary embodiment includes a latch-lever locking mechanism 538, which includes separate locking levers 540 that clamp down on each of the electrical wires 226 to retain the electrical wires 226 in place and prevent them from becoming inadvertently disconnected from the power connection block 230. The locking levers 540 of locking mechanism 538 are moveable between an open or unlocked position which permits the electrical wires 226 to be inserted into the power connection block 230 and a locked position, in which the locking levers 540 of latch-lever locking mechanism 538 retain electrical wires 226 in place within power connection block 230.

The locking mechanism 538 may be used to eliminate the need for wire-to-wire crimp connections and, thus, reduce the time it takes to make/replace the electrical connections. The electrical wires 226 may be quickly inserted through the channels of seal 218 into wire insertion opening 232 of power connection block 230 with the levers 540 of locking mechanism 538 in the unlocked position. Then the levers 540 of locking mechanism 538 may be moved to the locked position, to retain the electrical wires 226 within the power connection block 230 and complete the electrical connection of the electrical wires 226 to the motor. This process is much easier and quicker than the wire-to-wire crimp connections used in conventional motors and allows for quick servicing of the motor if the electrical connections need to be changed/adjusted. In additional embodiments, the locking mechanisms may be a screw locking mechanism, a toggle/bayonet locking mechanism, or the like. In various additional embodiments, no locking mechanism is provided.

In the illustrated exemplary embodiment, the wire receptacle 238 is wired for voltage selection, and the jumper plug 236 has two insertion positions for voltage selection. The jumper plug 236 is configured and adapted for insertion into the wire receptacle 238 in two alternative positions, a first position that is configured to provide the motor 200 with low-voltage incoming power and a second position that is configured to provide the motor 200 with high-voltage incoming power. The use of a jumper plug 236 that can be used to switch between high-voltage and low-voltage is much quicker than undoing and replacing multiple wire-to-wire crimp connections for voltage selection.

As previously described herein, the electric motor 200 is sealed to prevent moisture from entering the casing 202. However, sealing the motor 200, as described above, can lead to undesirable wide pressure fluctuations as the motor 200 experiences its normal wide temperature fluctuations. To prevent the wide pressure fluctuations, the motor 200 must be breathable. Accordingly, the motor 200 may include at least one breather plug 242 that is disposed in at least one of the end bells 210, 212. In alternative embodiments, the breather plug 242 may be disposed in the casing 202 of the motor 200, or in any location that allows the interior of the motor 200 to be breathable. The breather plug 242 provides for air flow between the interior of the motor 200 and the exterior thereof without allowing moisture to seep into the motor casing 202. The breather plug 242 may be constructed from, for example, expanded polytetraflouroethylene (PTFE) that has been processed to make it oleophobic or other suitable materials. An exemplary breather plug is described in U.S. Pat. No. 7,042,124, which is incorporated herein in its entirety. Referring to FIGS. 4A-4C, end bell 212 includes an opening 446 configured to receive breather plug 242.

If an electric motor 200 fails during production in, for example, a food processing plant, the electrical connections may need to be changed/adjusted in an efficient manner. The electric motor 200 and end bell 212 thereof disclosed in the present disclosure allows the electrical connections to be changed/adjusted easily and quickly. For example, in embodiments that include a removable cover 214 that is attached to the end bell 212 by a threaded connection, the removable cover 214 is easily removed/attached by screwing the cover on/off using, for example, a wrench. The removal of a screw on/off removable cover 214 reduces the time for changing electrical connections in comparison to removing several screws from a junction box.

Also, once the removable cover 214 is removed, both the power entry compartment 206 and the power connection compartment 208 are easily accessible for maintenance. For example, the main opening 207 of the power entry compartment 206 provides a user with access to the area in which electrical wires 226 enter the motor 200 and are fed into the power connection compartment 208, and the main opening 209 of the power connection compartment 208 provides a user with access to the area in which the electrical connections for the motor 200 are made. Moreover, the wire channels of the sealing member 218 provide an efficient means of pushing the electrical wires 226 through the seal and into the power connection compartment 208 while maintaining a proper seal between the power entry compartment 206 and the power connection compartment 208. Additionally, due to the alignment of wire channels of seal 218 with wire insertion openings 232 of the power connection block 230, the electrical wires 226 can be quickly and efficiently inserted into the wire insertion openings 232 to connect to the power connection block 230. Furthermore, the locking mechanism 538 provides a quick method of adequately securing the electrical wires 226 to the power connection block 230. The above-mentioned features of the motor 200 reduces the time it takes to change/adjust electrical connections of the motor 200 in comparison to sealing the individual wire-to-wire electrical connections within a junction box, crimping the bare wire ends inside a metal tube for the electrical connection, and sealing the electrical wires with a heat-shrinkable polymer tubing lined with a layer of hot-melt adhesive. Also, the motor 200 sufficiently seals the power connection compartment 208 using sealing member 216 and sealing member 218 to prevent the electrical connections in the power connection compartment 208 from being exposed to moisture.

Figure 6:
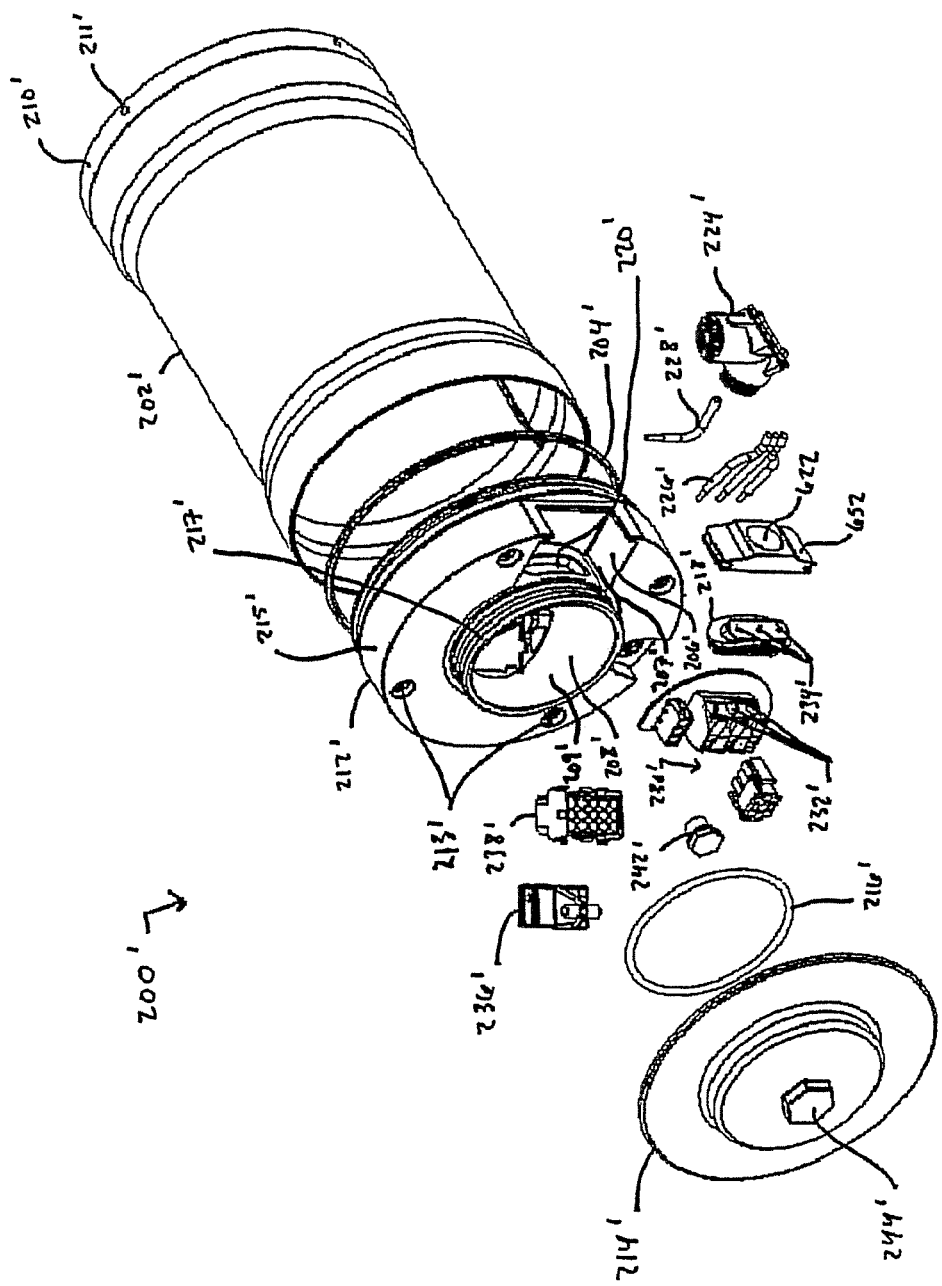
FIG. 6 is an exploded view of a second exemplary embodiment of an electric motor having another exemplary end bell.
Figure 7:
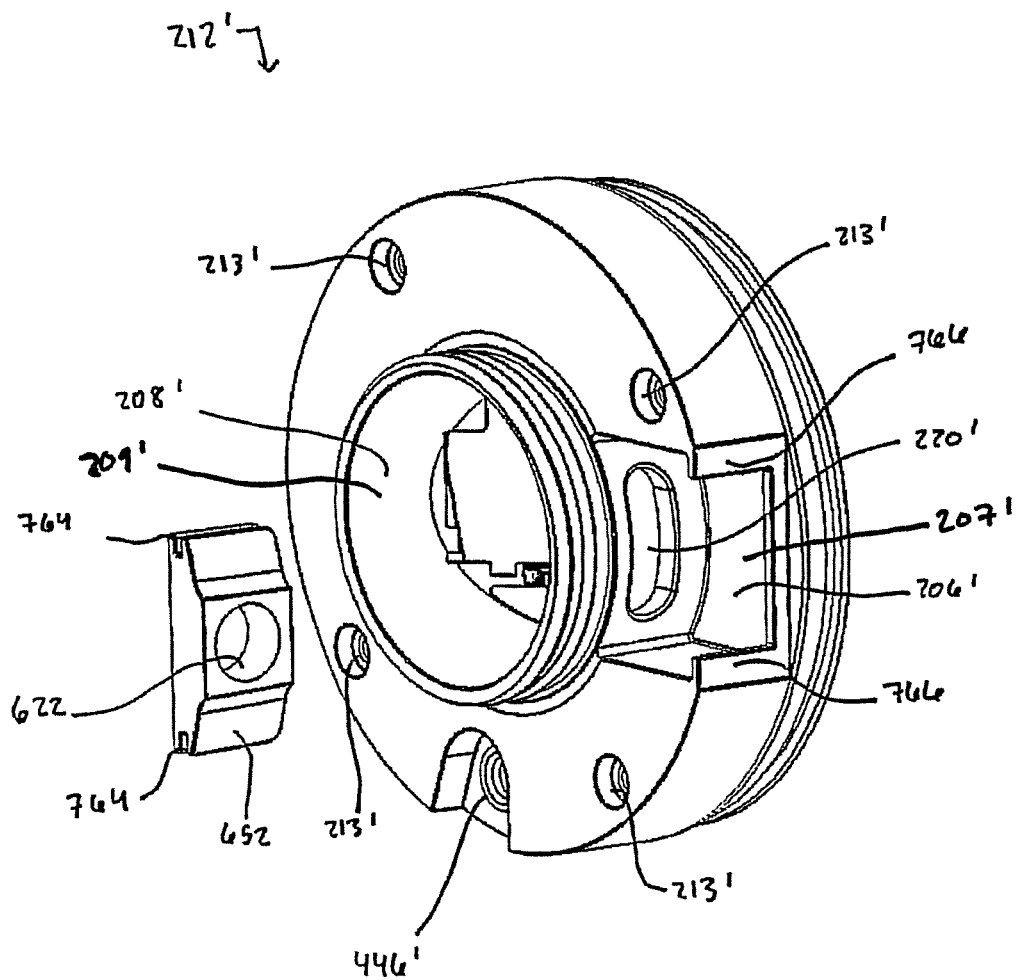
FIG. 7 is a perspective view of the exemplary end bell of FIG. 6.
Figure 8:
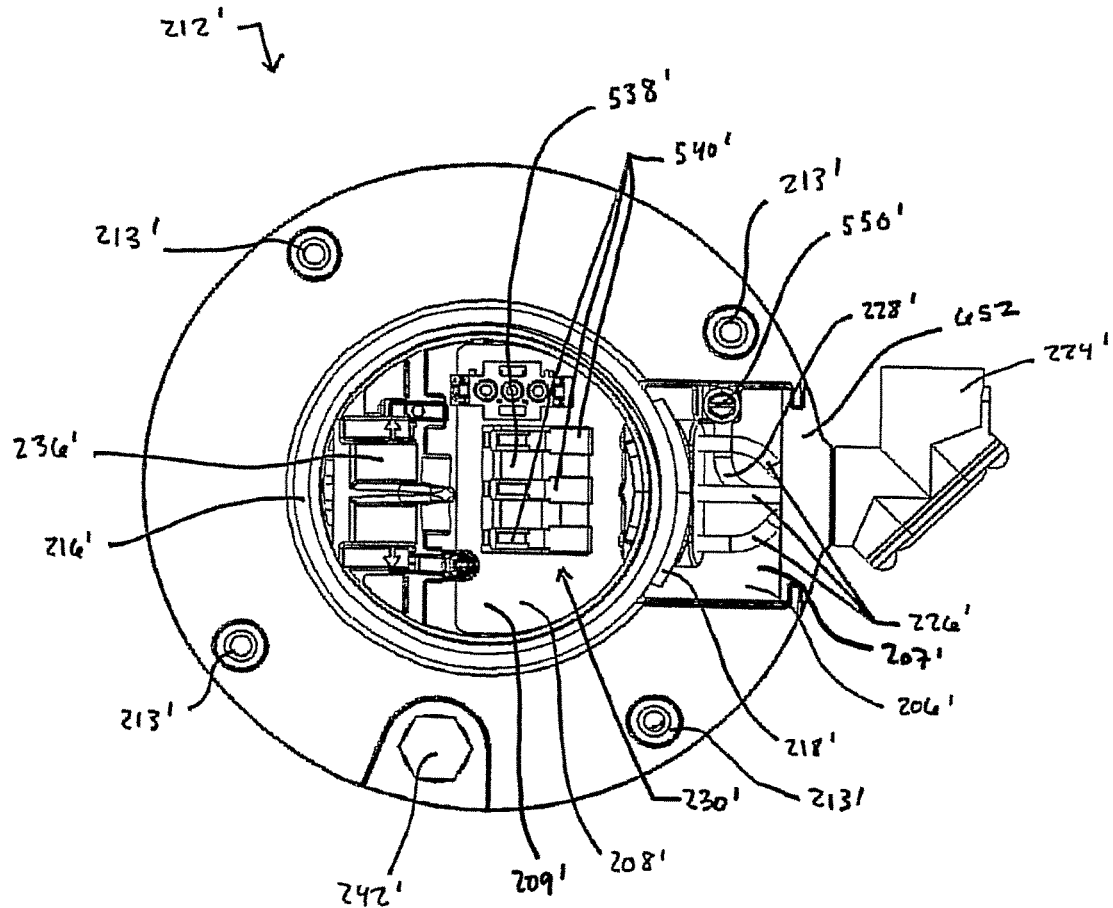
FIG. 8 is a front view of the exemplary end bell of FIG. 6 with electrical connections and sealing members installed.

Additional Exemplary Embodiment of a Motor and an End Bell: Referring to FIGS. 6-8, an additional exemplary embodiment of an end bell 212' for a motor 200' is shown. The prime symbol is utilized in FIGS. 6-8 to indicate elements of the motor 200' that may be similar, but may not be identical to elements of the motor 200. The exemplary embodiment of the motor 200' serves to provide an arrangement for making and protecting the electrical power connections of the motor, and serves to protect the internal components of the motor.

FIGS. 6-8 illustrate the alternative embodiment of the electric motor 200' having an alternative embodiment of an end bell 212'. The electric motor 200' includes a removable member 652 having an exterior electrical opening 622. The removable member 652 is configured to attach to the end bell 212' such that the exterior electrical opening 622 extends between the power entry compartment 206' and an outer surface of the end bell 212'. The removable member 652 may be attached to the end bell 212' in a variety of ways. In the illustrated embodiment, the removable member 652 includes grooves 764, and the end bell 212' includes tongue portions 766. The removable member 652 attaches to the end bell 212' by sliding the grooves 764 of the removable member 652 over the tongue portions 766 of the end bell 212. The removable member 652 remains attached to the end bell 212', and is prevented from sliding off of the end bell 212, by the removable cover 214'. However, when the removable cover 214' is removed, the removable member 652 is easily removable from the end bell 212' by sliding the removable member 652 off of the tongue portions 766 of the end bell 212'. In other embodiments, the removable member 652 may attach to the end bell 212' by a snap fit, a clip, fasteners, or any other fastening means. In some embodiments, the removable member 652 may rigidly attach to the end bell 212', such that the removable cover 214' is not needed to retain the removable cover 652 in place relative to the end bell 212'.

The exterior electrical opening 622 is configured to receive an electrical conduit 224' that houses the electrical wires that power the electric motor 200'. In an exemplary embodiment, the electrical conduit 224' may connect to the exterior electrical opening 622 of the removable member 652 by a threaded connection. In other embodiments, the electrical conduit 224' may connect to the exterior electrical opening 622 of the removable member 652 by snap fit, fasteners, welds or other fastening means. The power entry compartment 206' of the motor 200' receives electrical wires 226' and ground wire 228' through opening 622 of removable member 652.

If an electric motor 200' fails during production in, for example, a food processing plant, the electrical connections may need to be changed/adjusted in an efficient manner. The electric motor 200' and end bell 212' allows the electrical connections to be changed/adjusted easily and quickly. For example, in the alternative embodiment of the motor 200', once the removable cover 214' is removed, both the main opening 207' of the power entry compartment 206' and the main opening 209' of the power connection compartment 208' are easily accessible for maintenance. Additionally, the removable member 652 may be removed to provide more space for the electrical connections to be changed/adjusted.

Figure 10:
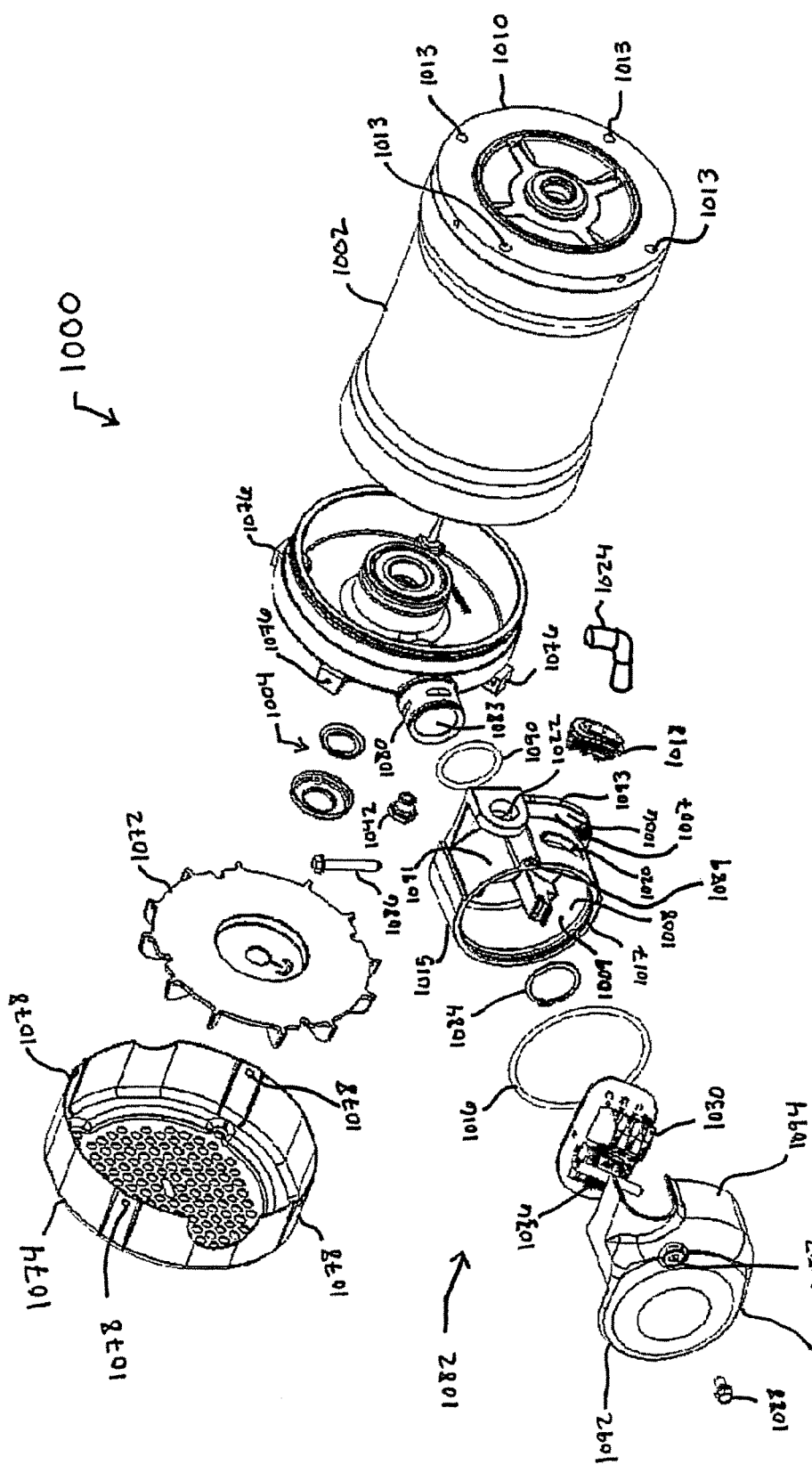
FIG. 10 is an exploded perspective view of an exemplary embodiment of an electric motor having a cooling fan, an exemplary end bell, and an exemplary junction box.

Additional Exemplary Embodiment of a Motor Having a Junction Box: Referring now to FIG. 10, an exploded view of another exemplary embodiment of an electric motor 1000 in accordance with the general inventive concepts is illustrated. The electric motor 1000 generally includes a cylindrical motor casing 1002, a first end bell 1010 and second end bell 1012, and an external cooling fan 1070 attached to the second end bell 1012. The external cooling fan 1070 includes fan blades 1072 and fan housing 1074. While the motor casing 1002, the first end bell 1010, the second end bell 1012, and the fan housing 1074 of the illustrated embodiment combine to form a generally cylindrical shape, the motor casing 1002, end bells 1010, 1012, and the fan housing 1074 may have any suitable shape in alternative embodiments. The motor casing 1002, the end bells 1010, 1012, and the fan housing 1074 may be formed from metal or other suitable materials. For example, the motor casing 1002, end bells 1010, 1012, and fan housing 1074 may be manufactured from a corrosion-resistant material such as stainless steel.

The structural components of the exemplary electric motor 1000 are similar to the previous electric motors 200 and 200' described in the present disclosure. The structural components include a stator assembly (not shown) fixedly mounted within the motor casing 1002, a rotor shaft assembly (not shown) with at least one end of the shaft extending outside the motor casing 1002 for coupling to an exterior device, and bearing assemblies (not shown) for accommodating rotation of the shaft.

In the illustrated embodiment, end bell 1010 is fastened to end bell 1012 using plurality of fasteners (not shown), such as elongated screws. In the illustrated embodiment, the screws pass through holes 1013 in end bell 1010, travel through the interior of the motor casing 1002 and attach to end bell 1012. The casing 1002 of the motor 1000 is disposed between the two end bells 1010, 1012 such that the interior of the motor is defined by the two end bells 1010, 1012 and the motor casing 1002. The removable coupling of end bells 1010, 1012 allows for the end bells 1010, 1012 and the casing 1002 to be separated from each other to permit access to the interior of the electric motor 1000. In additional embodiments, each of the end bells 1010, 1012 may directly connect to the casing 1002 by fasteners, a threaded connection, a snap fit, welding or any other suitable fastening method. In various embodiments, a sealing member (not shown) may be positioned between one or both of the end bells 1010, 1012 and the casing 1002 to prevent moisture from entering the interior of the electric motor 1000 by way of the junctions between the end bells 1010, 1012 and the casing 1002. In certain embodiments, the sealing member may be an O-ring.

As illustrated in FIG. 10, the electric motor 1000 includes a cooling fan 1070. The cooling fan 1070 includes fan blades 1072 and fan housing 1074. The fan blades 1072 are disposed in fan housing 1074, and the fan housing 1074 attaches to the second end bell 1012 by fasteners (not shown) being placed in through holes 1076 of the second end bell 1012 and through holes 1078 of fan housing 1074. In other embodiments, the fan housing may attach to the second end bell 1012 by a threaded connection, a snap fit, welding or any other suitable fastening method. The other suitable means may include quick-release, reusable fastening methods to aid in the disassembly of the housing 1074 and fan blades 1072 for cleaning, and re-assembly after cleaning. In the illustrated embodiment, the cooling fan 1070 includes a shaft (not shown) that extends outside of the end bell 1012, and the fan blades 1072 of the cooling fan 1070 attach to the extended shaft. During operation of the motor 1000, the cooling 1070 fan forces air around the outside of the end bell 1012 and the motor casing 1002. In certain embodiments, the motor 1000 includes sealing members 1004 to prevent moisture from entering the interior of the motor 1000 at the junction between the shaft of the cooling fan 1070 and the end bell 1012. As with exemplary embodiments of electric motor 200 and 200', additional embodiments of electric motor 1000 may be provided without a cooling fan 1070.

Figure 11:
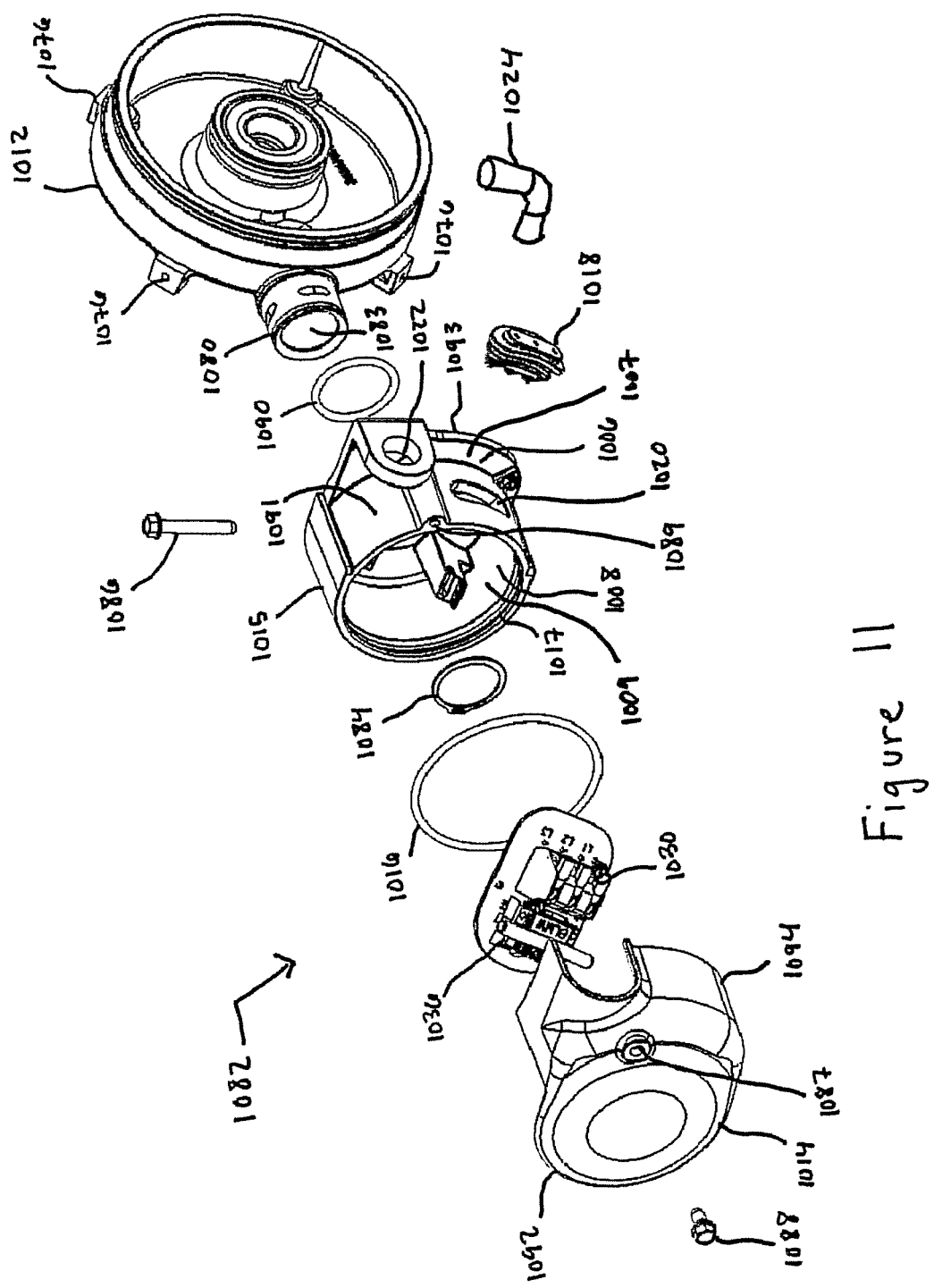
FIG. 11 is an exploded perspective view of the exemplary end bell and exemplary junction box of FIG. 10 illustrating an exemplary power entry compartment and an exemplary power connection compartment.

As illustrated in FIGS. 10-11, the junction box 1082 generally includes a power entry compartment 1006, a power connection compartment 1008, a removable cover 1014, a main body 1015, an interior electrical opening 1020, an exterior electrical opening 1022, a sealing member 1016, and a sealing member 1018. In the illustrated embodiment, the power connection compartment 1008 includes a main opening 1009 that has a generally circular shape. The main opening 1009 of the power connection compartment 1008 provides access to the electrical connections of the electric motor. The power entry compartment 1006 includes a main opening 1007 that has a generally arcuate shape. The main opening 1007 of the power entry compartment provides access to the area in which electrical wires enter the junction box 1082 and are fed into the power connection compartment 1008. In additional embodiments, the power entry compartment 1006, the power connection compartment 1008, and the main openings 1007, 1009 of each compartment may be shaped and configured differently.

The power entry compartment 1006 is adjacent to the power connection compartment 1008. The interior electrical opening 1020 extends between the power entry compartment 1006 and the power connection compartment 1008, and the sealing member 1018 is disposed in the interior electrical opening 1020 to prevent moisture from entering the power connection compartment 1008 from the power entry compartment 1006. The sealing member 1018 may take the any form of the sealing member 218 of the electric motor 200 described in the present disclosure. The sealing member 1016 is disposed between the removable cover 1014 and the main opening 1009 of the power connection compartment 1008 to provide a moisture-tight seal between the motor exterior and the power connection compartment 1008 that prevents moisture from entering the power connection compartment 1008. In the illustrated exemplary embodiment, the sealing member 1016 is an O-ring, although the sealing member 1016 may be shaped and configured differently in additional embodiments. The sealing member 1016 may be made from rubber, plastic, other polymeric or elastomeric materials, or any other suitable materials. In alternate embodiments, the removable cover 1014 may at least partially include rubber, plastic, other polymeric or elastic materials, or any other suitable material to prevent moisture from entering the power connection compartment 208". In the alternate embodiments, the sealing member 216" may not be needed.

The removable cover 1014 is shaped and configured to define a part of and at least partially enclose the power entry compartment 1006 when the removable cover 1014 is attached to the main body 1015 of the junction box 1082. The removable cover 1014 is also shaped and configured to define a part of and at least partially enclose the power connection compartment 1008 when the removable cover 1014 is attached to the main body 1015 of the junction box 1082. In various embodiments, the removable cover 1014 encloses or seals the main opening 1009 of the power connection compartment 1008, and encloses/seals or at least partially encloses/seals the main opening 1007 of the power entry compartment 1006. In the illustrated embodiment, the removable cover 1014 is a unitary piece that includes a circular shaped portion 1092 and an extended portion 1094. The extended portion 1094 of the removable cover 1014 is shaped and configured to define a part of and enclose the main opening 1007 of the power entry compartment 1006. In the exemplary embodiment, the power entry compartment 1006 is an enclosed space that is defined by the combination of an outer surface of the main wall 1091 of the main body 1015, a projected piece 1093 of the main body 1015, and the extended portion 1094 of the removable cover 1014 when the removable cover is installed onto the main body 1015. The circular portion 1092 of the removable cover 1014 is shaped and configured to combine with a generally cylindrically shaped enclosed space formed by the main wall 1091 of the main body 1015 to enclose the power connection compartment 1008.

In various embodiments, the removable cover 1014 and main body 1015 may have a variety of suitable shapes and configurations. For example, in additional embodiments, each of the power entry compartment 1006 and the power connection compartment 1008 may be defined by two separate enclosed spaces that are formed by the main wall 1091 of the main body 1015. In various embodiments the removable cover 1014 may be a unitary piece or comprise multiple pieces. The exemplary removable cover 1014 is attached to the main body 1015 of the junction box 1082 by a fastener 1088, which is inserted into through hole 1087 of the removable cover 1014 and attaches to aperture 1089 of the main body 1015. In additional embodiments, the removable cover 1014 may be attached to the main body 1015 of the junction box 1082 in different ways, such as, for example, by a snap fit, a threaded connection, or any other suitable attachment mechanism.

The removable cover 1014 seals the power entry compartment 1006. The extended portion 1094 of the removable cover 1014 contacts the projected piece 1093 of the main body 1015 when the removable cover 1014 is attached to the junction box 1082. While the junction between the extended portion 1094 of the removable cover 1014 and the projected piece 1093 of the main body 1015 does not provide a moisture-tight seal, it generally protects the power entry compartment 1006 from much of the moisture that results from a direct high pressure spray during the cleaning process. In additional embodiments, a seal may be disposed between the removable cover 1014 and the power entry compartment 1006 to provide a moisture-tight seal between the motor exterior and the power entry compartment 1006 when the removable cover 1014 is attached to the junction box 1082.

The exterior electrical opening 1022 extends between an outer surface of the junction box 1082 and the power entry compartment 1006. In the illustrated embodiment, the exterior electrical opening 1022 is disposed on the projected piece 1093 of the main body 1015 of the junction box 1082. In another embodiment, the exterior electrical opening 1022 may be disposed in the removable cover 1014 of the junction box 1082. In yet another embodiment, the exterior electrical opening 1022 may be disposed in a removable piece (not shown—similar to piece 652 in FIG. 6-8) that fits between the removable cover 1014 and the main body 1015 of the junction box 1082. The exterior electrical opening 1022 is configured to receive a conduit 1024 that carries the electrical wires (not shown) and ground wire (not shown) for the motor 1000. The electrical conduit 1024 may connect to the exterior electrical opening 1022 of the junction box 1082 by a threaded connection, a snap fit, fasteners, welds, or other fastening means.

The junction box 1082 of the illustrated embodiment provides several advantages in comparison to a conventional junction box. The removable cover 1014 of the illustrated embodiment reduces the time it takes to replace the electrical connection for the electric motor 1000, as compared to a conventional junction box, because the cover can be removed and the electrical connections of the electric motor 1000 can be accessed more easily, quickly and efficiently than when a conventional junction box is used. For example, a conventional junction box typically includes multiple fasteners that can be difficult and time consuming to remove and reinstall. In contrast, the removable cover 1014 can be easily removed and reinstalled by the way of a single fastener 1088.

The sealing member 1016 is disposed between the removable cover 1014 and the power connection compartment 1008. In the exemplary embodiment illustrated in FIGS. 10-11, the sealing member 1016 is disposed in a slot 1017 of the main body 1015 that encircles the power connection compartment 1008. The circular portion 1092 of the removable cover 1014, the sealing member 1016, and the slot 1017 are adapted and configured to enclose and seal the power connection compartment 1008 of the junction box 1082 when the removable cover 1014 is attached to the junction box 1082 to provide a moisture-tight seal between the motor exterior and the power connection compartment 1008 that prevents moisture from entering the power connection compartment 1008. In the illustrated exemplary embodiment, the sealing member 1016 is an O-ring, although the sealing member 1016 may be shaped and configured differently in additional embodiments. The sealing member 1016 may be made from rubber, plastic, other polymeric or elastomeric materials or any other suitable materials. Since holes 1087 and 1089 for the fastener 1088 that is used to attach the removable cover 1014 to the main body 1015 are outside of the periphery of seal 1016, holes 1087 and 1089 do not serve as entry points through which moisture may bypass the seal created by seal 1016 and enter the power connection compartment 1008 of junction box 1082.

The junction box 1082 may be attached to the electric motor 1000 in a variety of ways. Referring again to FIG. 10, the junction box 1082 is connected to the end bell 1012. In various additional embodiments, the junction box 1082 may be attached to a portion of the motor casing 1002 or other portion of the electric motor 1000. In certain embodiments, the end bell 1012 of the electric motor 1000 includes an electrical motor inlet 1080 for attaching the junction box 1082 to the electric motor 1000. The electrical motor inlet 1080 includes an opening 1083 that defines a passage between an interior of the electric motor 1000 and the power connection compartment 1008 of the junction box 1082 when the junction box 1082 is attached to the motor 1000 so that the wires of the motor 1000 can be connected to the wires that enter the junction box through electrical conduit 1024 in the power connection compartment 1008. In the illustrated embodiment, the electrical motor inlet 1080 is a conduit, but it may be shaped or configured differently in additional embodiments.

Figure 12:
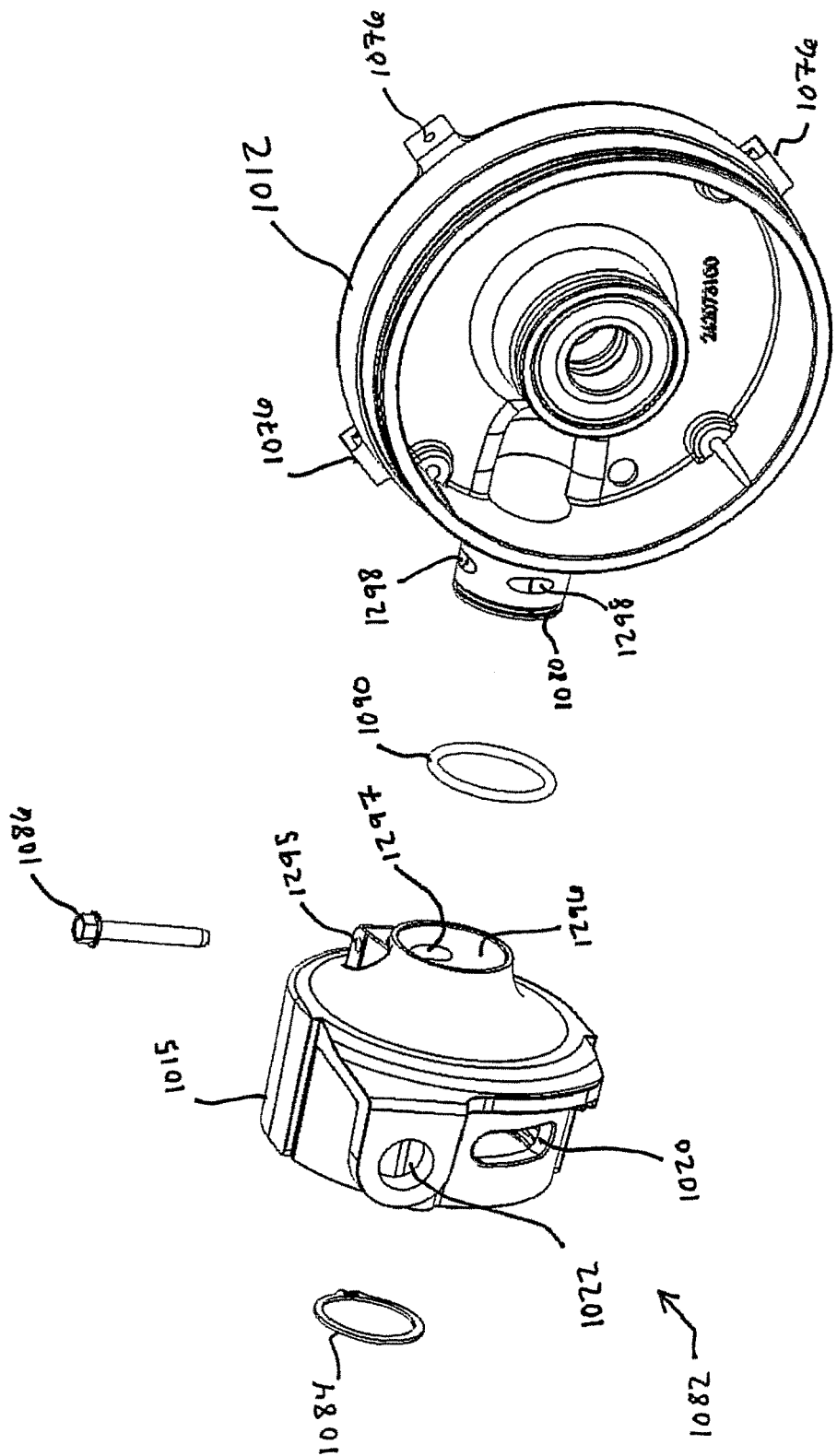
FIG. 12 is an exploded perspective view of the exemplary end bell and exemplary junction box of FIG. 10.
Figure 13:
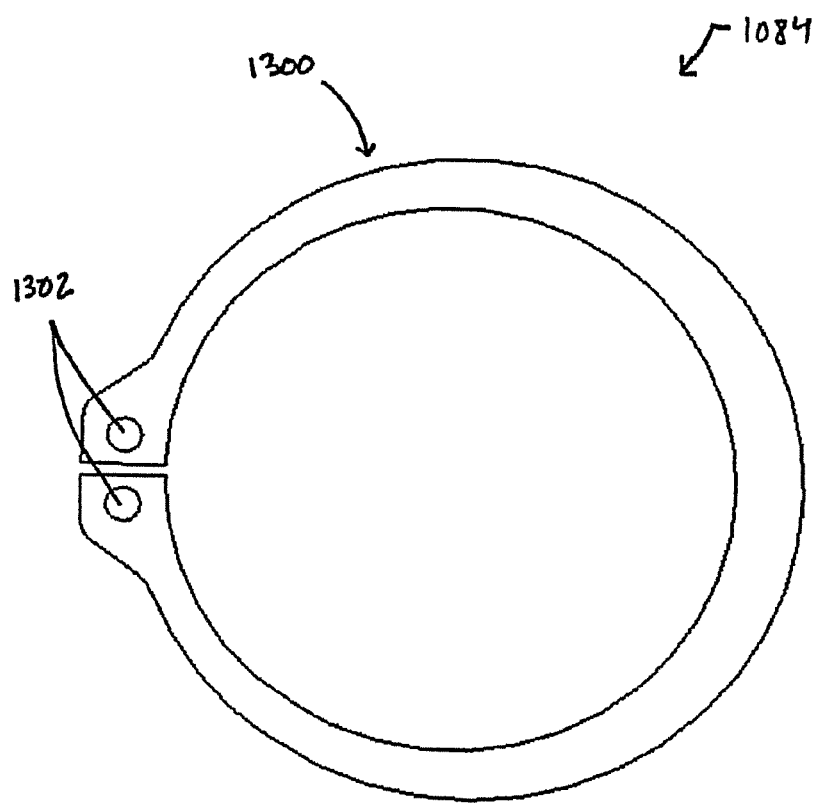
FIG. 13 is a front view of an exemplary locking ring.

Referring again to FIG. 10, the end bell 1012 includes electrical motor inlet 1080 for connecting the junction box 1082 to the electric motor 1000. The junction box 1082 may be attached to the electrical motor inlet 1080 in a variety of ways. In the illustrated embodiment, the junction box 1082 attaches to the electrical motor inlet 1080 by a locking ring 1084, which, once installed, prevents the junction box 1082 from moving axially relative to the electrical motor inlet 1080 so that the junction box 1082 cannot be inadvertently removed from the electrical motor inlet 1080. Referring to FIGS. 12 and 13, the junction box 1082 is installed on the end bell 1012 by placing the opening 1296 of the junction box 1082 over the electrical motor inlet 1080 of the end bell 1012, such that the end of the electrical motor inlet 1080 extends past the opening 1296 and into the interior of the junction box 1082. Once the end of the electrical motor inlet 1080 is extended into the interior of the junction box 1082, the locking ring 1084 is placed on the end of the electrical motor inlet 1080 to prevent the junction box 1082 from moving axially relative to the electrical motor inlet 1080. The locking ring 1084 includes a main body 1300 having a generally circular shape and a pair of openings 1302 defined in the main body 1300. In the exemplary embodiment illustrated in FIG. 13, the locking ring 1084 is in its normal position such that the openings 1302 are adjacent to each other. In order to place the locking ring 1084 on the electrical motor inlet 1080, the openings 1302 are pulled apart to expand the inside circumference of the locking ring 1084, and, once the locking ring 1084 is in line with the electrical motor inlet 1080, the openings 1302 are moved back to the normal position, which causes the locking ring 1084 to be secured to the electrical motor inlet 1080. To remove the junction box 1082 from the electrical motor inlet 1080, locking ring 1084 must first be removed by pulling apart the openings 1302. When the junction box 1082 and the locking ring 1084 are secured to the electrical motor inlet 1080, the junction box 1082 may freely rotate about the electrical motor inlet 1080. In this way, the orientations and position of the junction box 1082 can be adjusted. In other embodiments, the junction box 1082 may attach to the end bell 1012 by a threaded connection, a snap fit, welding or any other suitable fastening method. In various embodiments, a sealing member 1090 may be positioned between the electrical motor inlet 1080 and the end bell 1012 of the electric motor 1000 when the junction box 1082 is attached to the electric motor 1000 to prevent moisture from entering the interior of the electric motor. In certain embodiments, the sealing member 1090 may be an O-ring.

Referring now to FIG. 12, the junction box 1082 includes an opening 1296 that attaches to the electrical motor inlet 1080 of the end bell 1012 and an aperture 1295 for receiving the fastener 1086. The fastener 1086 may be used to lock the junction box 1082 in place and prevent it from rotating about the electrical motor inlet 1080. When the fastener 1086 is inserted into aperture 1295, a portion of the fastener 1295 enters the opening 1296 of the junction box 1082 through the slot 1297, and, when the conduit 1082 is placed in the opening 1296 of the junction box 1082, the aperture 1295 opens against an outside surface of the electrical motor inlet 1080. In the illustrated embodiment, the electrical motor inlet 1080 of the end bell 1012 includes grooves 1298. In attaching the junction box 1082 to the end bell 1012, the slot 1297 of the opening 1296 is aligned with one of the grooves 1298 of the electrical motor inlet 1080, and the fastener 1086 is inserted into aperture 1295 and through the slot 1297 such that fastener 1086 engages the groove 1298 that is aligned with the slot 1297. The engagement between the fastener 1086 and the groove 1298 fixedly attaches the junction box 1082 to the end bell 1012 and prevents the junction box 1082 from rotating about the electrical motor inlet 1080. In the illustrated embodiment, the conduit includes four grooves 1298, which allows the junction box 1082 to be attached in four different configurations. In other embodiments, the conduit may include one groove, two grooves, three grooves, or any number of grooves that allows the junction box 1082 to fixedly attach to electrical motor inlet 1080 of the end bell 1012. In alternative embodiments, the junction box 1082 may attach to the electrical motor inlet 1080 of the end bell 1012 by any means that fixedly attaches the junction box 1082 to the end bell 1012 and prevents the junction box 1082 from rotating after being attached. For example, the junction box 1082 may be attached to the end bell 1012 by a snap fit, a threaded connection, a fastener, a weld, or an adhesive.

Figure 14:
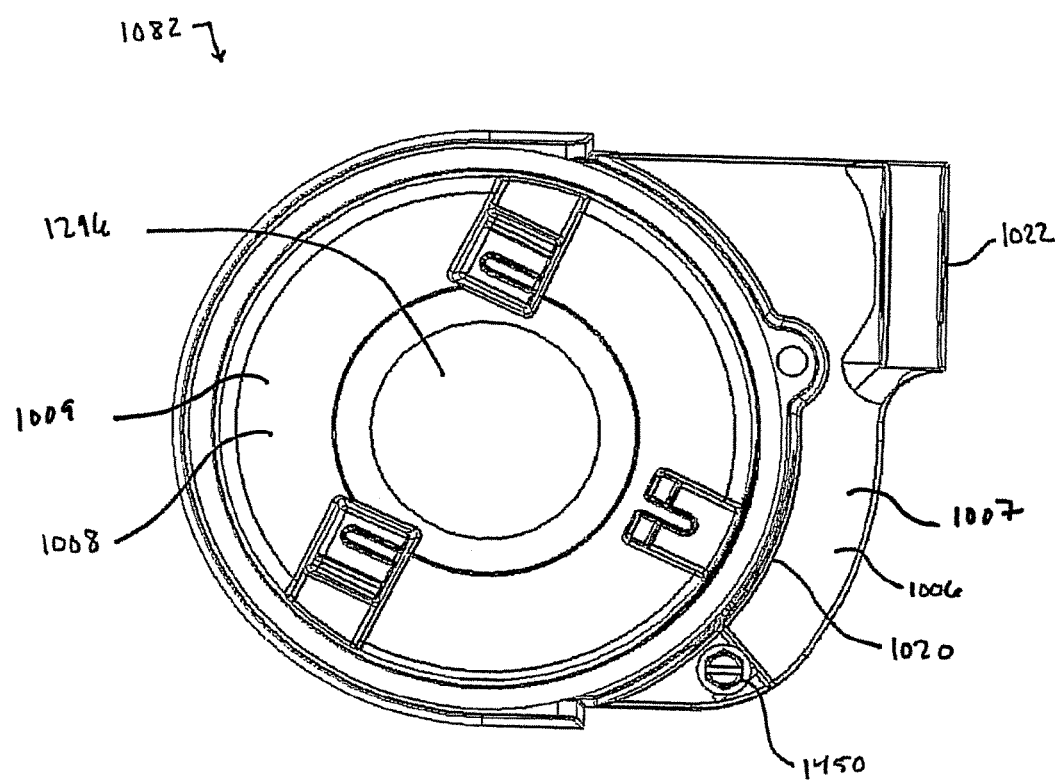
FIG. 14 is a front view of the exemplary junction box of FIG. 10 without the electrical components for making electrical connections installed.

Referring to FIG. 14, the junction box 1082 of the illustrated embodiment includes a power entry compartment 1006 and a power connection compartment 1008. The electrical wires (not shown) and the ground wire (not shown) enter the power entry compartment through the exterior electrical opening 1022 of the junction box 1082. The ground wire connects to the motor 1000 at the ground wire connection point 1450 in the power entry compartment 1006. The electrical wires enter the power connection compartment 1008 through the interior electrical opening 1020 of the junction box 1082. The electrical wires for the motor 1000 enter into the interior of the electric motor 1000 through opening 1296.

Figure 15:
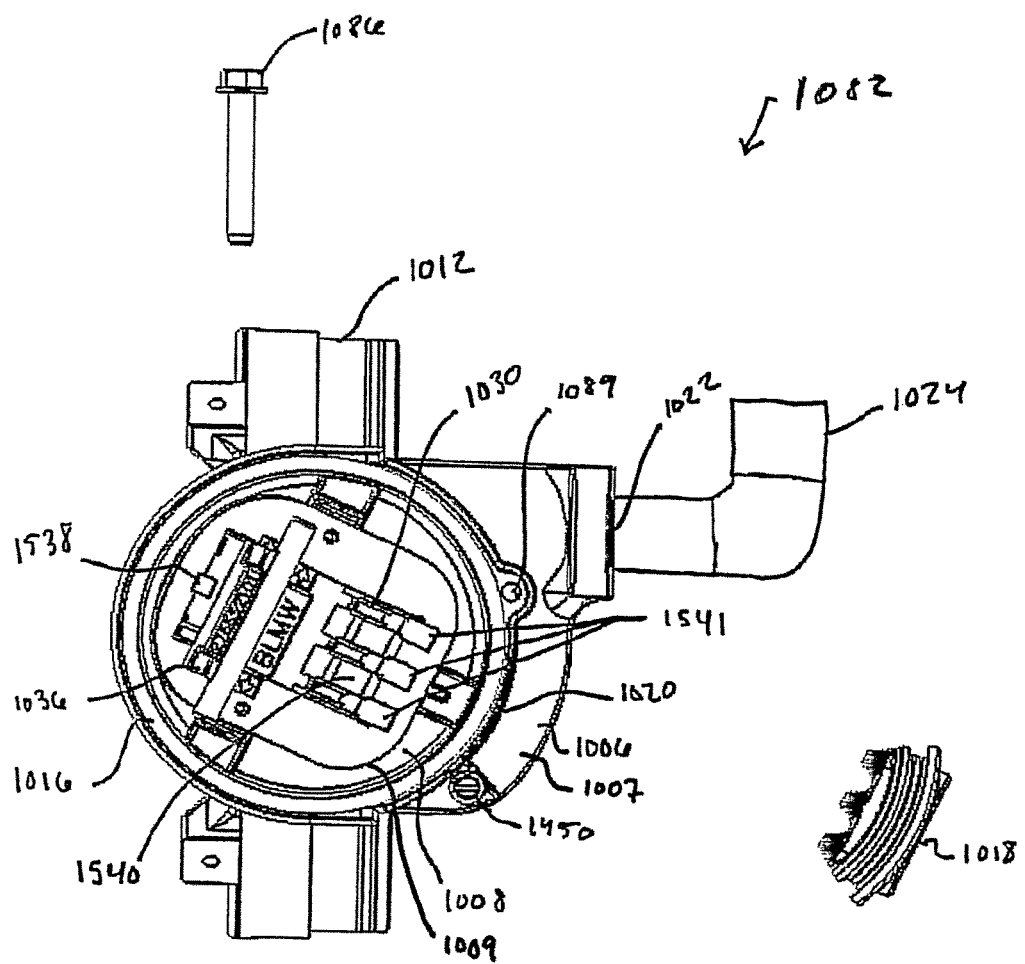
FIG. 15 is a front view of the exemplary junction box of FIG. 10 with exemplary electrical components and exemplary sealing members.

Referring to FIG. 15, the electrical connections for the motor 1000 are made in a similar manner to the electrical connections made in the motor 200 (see FIGS. 2-5) and the motor 200' (see FIGS. 6-8). The electrical conduit 1024 carries the electrical wires and the ground wire, and the electrical wires and ground wire enters the power entry compartment 1006 through opening 1022. The ground wire connects to the motor 1000 in the power entry compartment 1008 at the ground wire connection point 1450. Sealing member 1018 includes at least one wire channel (not shown) to allow the electrical wires to enter the power connection compartment 1008 from the power entry compartment 1006 through opening 1020. As previously discussed in relation to motors 200 and 200', the power connection compartment 1008 is sealed from the power entry compartment 1006 by the seal created between the electrical wires and the inner surface of the channels of the sealing member 1018. In addition, the power connection compartment is sealed by sealing member 1016 that is disposed between the main body 1015 and removable cover 1014 of the junction box 1082. As a result, if any moisture enters the power entry compartment 1006 either through opening 1022 from the electrical conduit 1024 or through any gaps between the main body 1015 and the removable cover 1014 of the junction box 1082, such moisture is prevented from entering the power connection compartment by the moisture-tight seal created by the sealing member 1016 and the sealing member 1018. Furthermore, since no wire-to-wire electrical connections are made in the power entry compartment 1006, if moisture enters the power entry compartment 1006, it is not likely to cause a short circuit or corrode any wire-to-wire electrical connections.

The electrical components used to make the electrical connections of the electric motor 1000 are similar to the electrical component used in electric motors 200 and 200", and the electrical components used in electric motor 1000 may take any form described in the present disclosure regarding motors 200 and 200'. Referring to FIG. 15, the electrical components include a power connection block 1030 on a printed circuit board (not shown), a wire receptacle 1538, and a jumper plug 1036. The power connection block 1030 includes at least one wire insertion opening (not shown) to connect the electrical wires to the electric motor 1000. In the illustrated embodiment, the wire insertion openings are aligned with the wire channels of the sealing member 1018. The power connection block may include various number of wire insertion openings, including any number of wire insertion openings described in the present disclosure regarding electric motors 200 and 200'. In addition, the power connection block 1030 may take any of the forms described in the present disclosure regarding the power connection block 230 for the motor 200. For example, the power connection block 1030 may include a locking mechanism 1540, which lock the electrical wires in place and prevent them from becoming inadvertently disconnected from the power connection block 1030. The locking mechanism 1540 may take any form described in the present disclosure regarding the locking mechanism 538. For example, the locking mechanism 1540 may include locking levers 1541. As discussed above regarding the electric motor 200, the locking levers 1541 of the power connection block 1030 may be used to eliminate the need for wire-to-wire crimp connections, and thus reduce the time it takes to make/replace the electrical connections. Similar to the electric motor 200, the wire receptacle 1538 of the electric motor 1000 may be wired for voltage selection, and the jumper plug 1036 has two insertion positions for voltage selection. The use of the jumper plug 1036 can be used to switch between high-voltage and low-voltage much quicker than undoing and replacing multiple wire-to-wire crimp connections for voltage selection.

As discussed previously herein, the electric motor 1000 is sealed to prevent moisture from entering the casing 1002. However, sealing the motor 1000 can lead to undesirable wide pressure fluctuations as the motor 1000 experiences its normal wide temperature fluctuations, and the wide pressure fluctuations in the motor 1000 require the motor 1000 to be breathable. Accordingly, the motor 1000 may include at least one breather plug 1042 that is disposed in at least one of the end bells 1012, 1010. The breather plug 1042 provides for air flow between the interior of the motor 1000 and the exterior thereof without allowing moisture to seep into the motor casing 1002. The breather plug 1042 may take any form described in the present disclosure.

If an electric motor 1000 fails during production in, for example, a food processing plant, the electrical connections may need to be changed/adjusted in an efficient manner. The electric motor 1000 and the junction box 1082 disclosed in the present disclosure allows the electrical connections to be changed/adjusted easily and quickly. For example, in the embodiments that include a removable cover 1014 that is attached to the main body 1015 of the junction box 1082 by a single fastener 1088, the removable cover is easily removed/attached by screwing the fastener 1088 on/off using, for example, a screwdriver. The removal of a single fastener 1088 reduces the time for changing electrical connections in comparison to removing several screws from a conventional junction box.

Also, once the removable cover 1014 is removed, both the power entry compartment 1006 and the power connection compartment 1008 are easily accessible for maintenance. Moreover, the wire channels of the sealing member 1018 provide an efficient means of pushing the electrical wires through the seal and into the power connection compartment 1008 while maintaining a proper seal between the power entry compartment 1006 and the power connection compartment 1008. Additionally, due to the alignment of the wire channels of the seal 1018 with the wire insertion openings of the power connection block 1030, the electrical wires can be quickly and efficiently inserted into the wire insertion openings of the power connection block 1030. Furthermore, the locking mechanism 1540 provides a quick method of adequately securing the electrical wires to the power connection block 1030. The above-mentioned features of the motor 1000 reduces the time it takes to change/adjust electrical connections of the motor 1000 in comparison to sealing the individual wire-to-wire connections within a conventional junction box, crimping the bare wire ends inside a metal tube for the electrical connection, and sealing the electrical wires with a heat-shrinkable polymer tubing lined with a layer of hot-melt adhesive. Also, the motor 1000 sufficiently seals the power connection compartment 1008 using sealing member 1016, sealing member 1018, and sealing member 1090 to prevent the electrical connection in the power connection compartment 1008 from being exposed to moisture.

Figure 16:
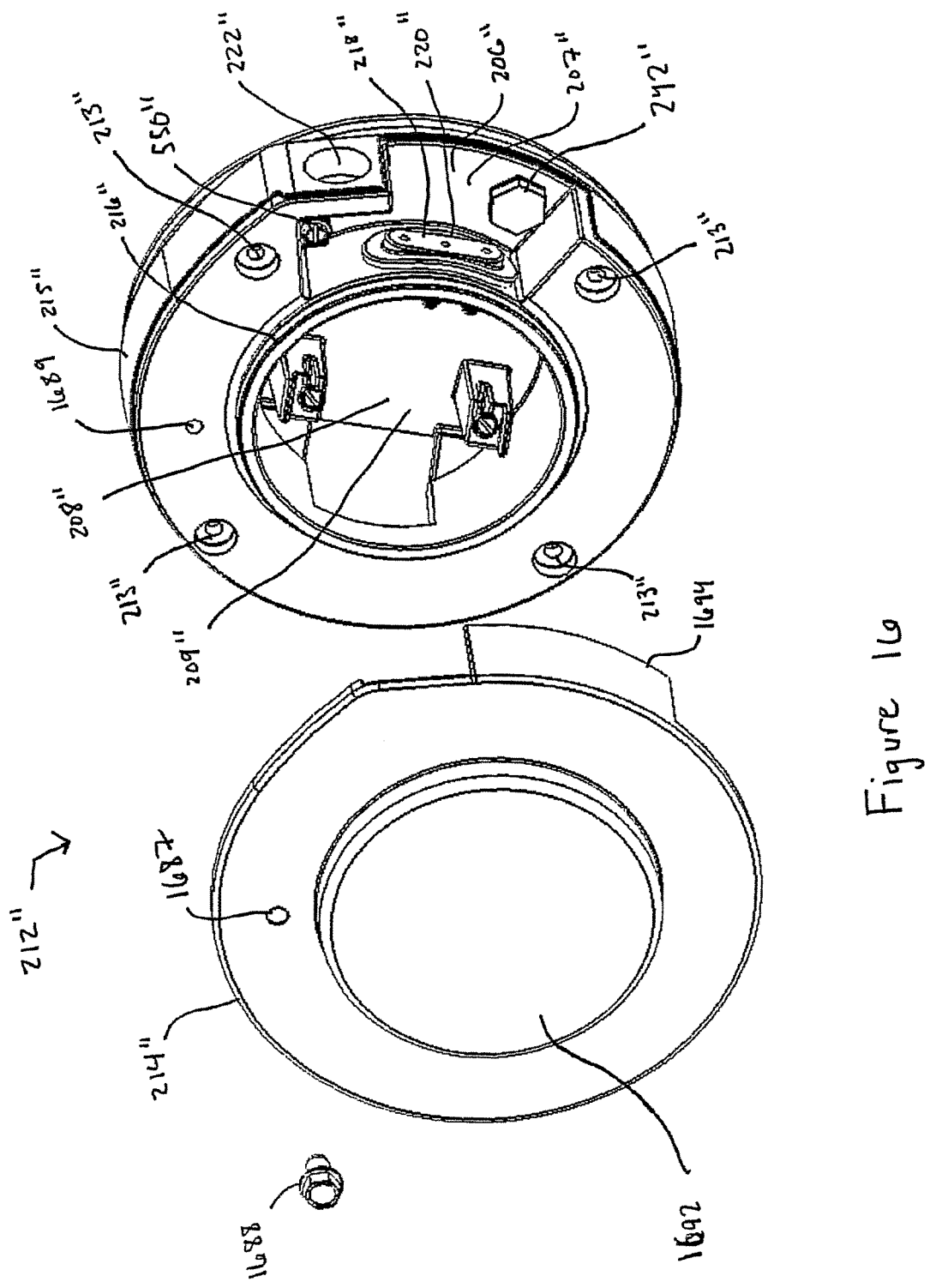
FIG. 16 is an exploded perspective view of another exemplary embodiment of an end bell for an electric motor.

Additional Exemplary Embodiment of an End Bell for an Electric Motor: Referring to FIG. 16, an additional exemplary embodiment of an end bell 212" for an electric motor is shown. The double prime symbol is utilized in FIG. 16 to indicate elements of the end bell 212" that may be similar, but may not be identical to elements of the end bells 212, 212' of motors 200, 200'. Similar to the end bells 212, 212', the exemplary end bell 212" serves to provide an arrangement for making and protecting the electrical power connections of a motor, and serves to protect the internal components of the motor.

The end bell 212" includes a main body 215" and a removable cover 214". In the illustrated embodiment, the removable cover 214" attaches to the main body 215" by a single fastener 1688 that is inserted into an aperture 1687 of the removable cover 214" and aperture 1689 of the main body 215". In other embodiments, the removable cover 214" may attach to the main body 215" by two or more fasteners. In alternative embodiments, the removable cover 214" may attach to the main body 215" by a snap fit, a threaded connection, or any other suitable attachment mechanism.

The removable cover 214" includes a circular shaped portion 1692 and an extended member 1694, and the exterior electrical opening 222" is disposed in the main body 215". The circular shaped portion 1692 is shaped and configured to enclose the main opening 209" of the power connection compartment 208", and the extended member 1694 is shaped and configured to enclose at least portion of the main opening 207" of the power entry compartment 206". The extended member 1694 allows the main opening 207" of the power entry compartment 206" to be larger when the removable cover 214" is removed, which provides more space for changing/adjusting the electrical connection of the motor. The exterior electrical opening 222" is disposed on the main body 215" of the end bell 212' in a location that provides for easier access to the interior electrical opening 220" and the sealing member 218", which makes it easier to move electrical wires from the power entry compartment 206" to the power connection compartment 208".

Referring to FIG. 16, the breather plug 242" is disposed in the power entry compartment 206", which provides protection to the breather plug 242 during washdown of the motor. As described herein, the breather plug may be disposed in any location that allows the interior of the motor to be breathable.

Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the general inventive concepts may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of the general inventive concepts, such identification is not intended to be exclusive, but rather there may be inventive aspects, concepts and features that are fully described herein without being expressly identified as such or as part of the general inventive concepts. Any descriptions of exemplary methods or processes are not limited to inclusion of all steps as being required in all cases, nor is the order that the steps are presented to be construed as required or necessary unless expressly so stated.

All references to singular characteristics or limitations of the present disclosure shall include the corresponding plural characteristic or limitation, and vice versa, unless otherwise specified or clearly implied to the contrary by the context in which the reference is made. To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." Thus, use of the term "or" herein is the inclusive, and not the exclusive use. In the present disclosure, the words "a" or "an" are to be taken to include both the singular and the plural. Conversely, any reference to plural items shall, where appropriate, include the singular.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

While the invention has been illustrated and described in detail in the drawings and foregoing description, the same is to be considered as illustrative and not restrictive in character. It should be understood that only the exemplary embodiments have been shown and described and that all changes and modifications that come within the spirit of the invention are desired to be protected.

In accordance with the provisions of the patent statutes, the principles and modes of the improved electric motors and end bells for electric motors have been explained and illustrated in their preferred embodiment. However, it must be understood that the improved electric motors and end bells for electric motors may be practiced otherwise than as specifically explained and illustrated without departing from its spirit or scope.

The invention claimed is:

1. An electric motor comprising:
   a motor casing;
   a stator assembly;
   a rotor assembly;
   a power entry compartment;
   a power connection compartment for housing one or more components for making electrical connections of at least one electrical wire for providing power to the electric motor;
   a removable cover that at least partially encloses the power entry compartment and the power connection compartment;
   an interior electrical opening located between the power entry compartment and the power connection compartment;
   a sealing member disposed in the interior electrical opening and configured to allow at least one electrical wire to extend through the interior electrical opening from the power entry compartment into the power connection compartment; and
   an exterior electrical opening located between an outer surface of the electric motor and the power entry compartment.

2. The electric motor of claim 1, further comprising a power connection block disposed in the power connection compartment, wherein the power connection block comprises at least one wire insertion opening configured to receive at least one electrical wire that extends through the interior electrical opening.

3. The electric motor of claim 2, wherein the power connection block comprises a locking mechanism.

4. The electric motor of claim 1, wherein the sealing member disposed in the interior electrical opening is a grommet comprising at least one wire channel.

5. The electric motor of claim 4, wherein the at least one wire channel of the grommet is aligned with at least one wire insertion opening of a power connection block disposed in the power connection compartment.

6. The electric motor of claim 1, wherein the sealing member disposed in the interior electrical opening is a grommet comprising three wire channels that are aligned with three wire insertion openings of a power connection block disposed in the power connection compartment.

7. The electric motor of claim 1, further comprising a jumper plug with two positions for voltage selection, wherein the jumper plug is disposed in the power connection compartment.

8. The electric motor of claim 1, further comprising an end bell disposed on the motor casing, wherein the power entry compartment and the power connection compartment are disposed in the end bell.

9. The electric motor of claim 1, further comprising a junction box positioned on an exterior surface of the motor, wherein the power entry compartment and the power connection compartment are disposed in the junction box and the removable cover attaches to the junction box to at least partially encloses the power entry compartment and the power connection compartment.

10. The electric motor of claim 9, further comprising an external cooling fan.

11. The electric motor of claim 1, further comprising a sealing member disposed between the removable cover and the power connection compartment.

12. An electric motor comprising:
   a motor casing;
   a stator assembly;
   a rotor assembly;
   a junction box, the junction box comprising:
      a power entry compartment, wherein the power entry compartment comprises a main opening;
      a power connection compartment for housing one or more components for making electrical connections of at least one electrical wire for providing power to the electric motor, wherein the power connection compartment comprises a main opening;
      a removable cover that encloses the main opening of the power connection compartment and at least partially encloses the main opening of the power entry compartment;
      an interior electrical opening located between the power entry compartment and the power connection compartment;
      a sealing member disposed in the interior electrical opening and configured to allow at least one electrical wire to extend through the interior electrical opening and into the power connection compartment; and
      an exterior electrical opening located between an outer surface of the junction box and the power entry compartment.

13. The electric motor of claim 12, further comprising an electrical motor inlet for attaching the junction box to the motor casing, wherein the electrical motor inlet comprises a motor opening that provides a passage between an interior of the motor casing and the power connection compartment of the junction box when the junction box is attached to the electrical motor inlet; and a third sealing member disposed between the electrical motor inlet and the junction box when the junction box is attached to the electric motor inlet.

14. The electric motor of claim 13, wherein the electrical motor inlet comprises a conduit.

15. The electric motor of claim 14, further comprising a locking ring for attaching the junction box to the conduit while still allowing the junction box to move rotationally relative to the conduit.

16. The electric motor of claim 14, wherein the junction box further comprises an aperture for receiving a fastener, wherein the aperture opens against an outside surface of the conduit when the junction box is attached to the conduit.

17. The electric motor of claim 16 wherein the conduit comprises at least one groove, wherein the junction box attaches to the conduit by the fastener disposed in the aperture of the junction box that engages one of the at least one grooves of the conduit.

18. The electric motor of claim 16, wherein the conduit comprises four grooves such that the junction box can be attached to the conduit in at least four different positions, wherein the junction box attaches to the conduit by the fastener disposed in the aperture of the junction box that engages one of the four grooves of the conduit.

19. The electric motor of claim 12, further comprising a power connection block disposed in the power connection compartment, wherein the power connection block comprises at least one wire insertion opening configured to receive at least one electrical wire that extends through the power connection opening.

20. The electric motor of claim 12, further comprising a sealing member disposed between the removable cover and the main opening of the power connection compartment.

21. The electric motor of claim 12, wherein the sealing member disposed in the interior electrical opening is a grommet comprising at least one wire channel.

22. The electric motor of claim 21, wherein the at least one wire channel of the grommet is aligned with at least one wire insertion opening of a power connection block disposed in the power connection compartment.

23. The electric motor of claim 12, wherein the sealing member disposed in the interior electrical opening is a grommet comprising three wire channels.

24. An electric motor comprising:
a motor casing;
a stator assembly;
a rotor assembly;
a junction box, the junction box comprising:
   a power entry compartment comprising a main opening;
   a power connection compartment comprising a main opening;
   a power connection block disposed in the power connection compartment, wherein the power connection block comprises at least one wire insertion opening configured to receive at least one electrical wire for providing power to the electric motor;
   a removable cover that encloses the main opening of the power connection compartment and at least partially encloses the main opening of the power entry compartment;
   an interior electrical opening located between the power entry compartment and the power connection compartment;
   a grommet disposed in the interior electrical opening, wherein the grommet comprises at least one wire channel that is aligned with the at least one wire insertion opening of the power connection block; and
   an exterior electrical opening located between an outer surface of the junction box and the power entry compartment; and
a conduit for attaching the junction box to the motor casing, wherein the conduit comprises a motor opening that provides a passage between an interior of the electric motor and the power connection compartment of the junction box when the junction box is attached to the electric motor.

25. The electric motor of claim 24, further comprising a locking ring for attaching the junction box to the conduit while still allowing the junction box to move rotationally relative to the conduit.

26. The electric motor of claim 24, wherein the junction box further comprises an aperture for receiving a fastener, wherein the aperture opens against an outside surface of the conduit when the junction box is attached to the conduit.

27. The electric motor of claim 26, wherein the conduit comprises at least one groove, wherein the junction box attaches to the conduit by the fastener disposed in the aperture of the junction box that engages one of the at least one grooves of the conduit.

28. The electric motor of claim 26, wherein the conduit comprises four grooves such that the junction box can be attached to the conduit in at least four different positions, wherein the junction box attaches to the conduit by the fastener disposed in the aperture of the junction box that engages one of the four grooves of the conduit.

\* \* \* \* \*